(12) United States Patent
Andreoli

(10) Patent No.: US 11,305,943 B2
(45) Date of Patent: Apr. 19, 2022

(54) CONVEYOR OF ARTICLES

(71) Applicant: REXNORD FLATTOP EUROPE S.R.L., Correggio (IT)

(72) Inventor: Andrea Andreoli, Modena (IT)

(73) Assignee: REXNORD FLATTOP EUROPE S.R.L., Correggio (IT)

( * ) Notice: Subject to any disclaimer, the term of this patent is extended or adjusted under 35 U.S.C. 154(b) by 0 days.

(21) Appl. No.: 16/964,326

(22) PCT Filed: Jan. 24, 2019

(86) PCT No.: PCT/EP2019/051723
§ 371 (c)(1),
(2) Date: Jul. 23, 2020

(87) PCT Pub. No.: WO2019/145406
PCT Pub. Date: Aug. 1, 2019

(65) Prior Publication Data
US 2021/0039891 A1 Feb. 11, 2021

(30) Foreign Application Priority Data
Jan. 25, 2018 (IT) .................. 102018000001907

(51) Int. Cl.
*B65G 23/23* (2006.01)
*H02K 11/215* (2016.01)
(Continued)

(52) U.S. Cl.
CPC .............. *B65G 23/23* (2013.01); *B65G 17/08* (2013.01); *H02K 1/02* (2013.01); *H02K 11/215* (2016.01);
(Continued)

(58) Field of Classification Search
CPC ........ B65G 23/23; B65G 17/08; B65G 54/02; B65G 2203/043; B65G 2203/0283; H02K 11/215; H02K 1/02; H02K 41/031
(Continued)

(56) References Cited

U.S. PATENT DOCUMENTS 5,036,969 A * 8/1991 Garbagnati ........ B65G 21/2009
198/805
6,155,406 A * 12/2000 Garbagnati ........ B65G 21/2009
198/805

(Continued)

FOREIGN PATENT DOCUMENTS

CN 105391269 A 3/2016
EP 1714923 A2 10/2006
(Continued)

OTHER PUBLICATIONS

PCT International Search Report and Written Opinion, PCT/EP2019/051723, dated Apr. 2, 2019, 12 pages.
(Continued)

*Primary Examiner* — James R Bidwell
(74) *Attorney, Agent, or Firm* — Quarles & Brady LLP

(57) ABSTRACT

A conveyor system includes a transport chain with a sequence of interconnected chain links, a guide structure for slidingly supporting the transport chain so that chain links of the transport chain define a substantially flat support surface for supporting articles to be transported, and a motor for causing the transport chain to move with respect to the guide structure along a first direction parallel to the support surface. The motor comprises an electric linear motor including a plurality of magnets, each one located in a respective chain link, and a plurality of propulsion electromagnets located on the guide structure.

23 Claims, 21 Drawing Sheets

(51) Int. Cl.
*B65G 17/08* (2006.01)
*H02K 1/02* (2006.01)
*H02K 41/03* (2006.01)

(52) U.S. Cl.
CPC ... *H02K 41/031* (2013.01); *B65G 2203/0283* (2013.01); *B65G 2203/0291* (2013.01); *B65G 2203/043* (2013.01)

(58) Field of Classification Search
USPC .......................................................... 198/805
See application file for complete search history.

(56) References Cited

U.S. PATENT DOCUMENTS

| | | | | |
|---|---|---|---|---|
| 2006/0081448 A1* | 4/2006 | Fandella | ............ | B65G 21/2009 198/805 |
| 2009/0166158 A1* | 7/2009 | Stoiber | ............ | B65G 21/2009 198/805 |
| 2009/0183972 A1* | 7/2009 | Gauss | ............ | B65G 17/38 198/805 |
| 2018/0022553 A1* | 1/2018 | Andreoli | ............ | B65G 17/066 198/805 |

FOREIGN PATENT DOCUMENTS

| | | |
|---|---|---|
| EP | 2810035 B1 | 3/2016 |
| WO | 2010108509 A1 | 9/2010 |
| WO | 2016131879 A1 | 8/2016 |
| WO | 2017050524 A1 | 3/2017 |

OTHER PUBLICATIONS

TECNOTION, How Does A Linear Motor Work?, YouTube, May 22, 2017, XP054981985, https://www.youtube.com/watch?v=0_QB16-_jJU&t=105s, 1 page.

European Patent Office, Examination Report, Application No. 19701517.5, dated Jul. 5, 2021, 7 pages.

National Intellectual Property Administration, PRC, First Office Action and Search Report, Application No. 2019800101164, dated Nov. 8, 2021, 17 pages (with English summary).

\* cited by examiner

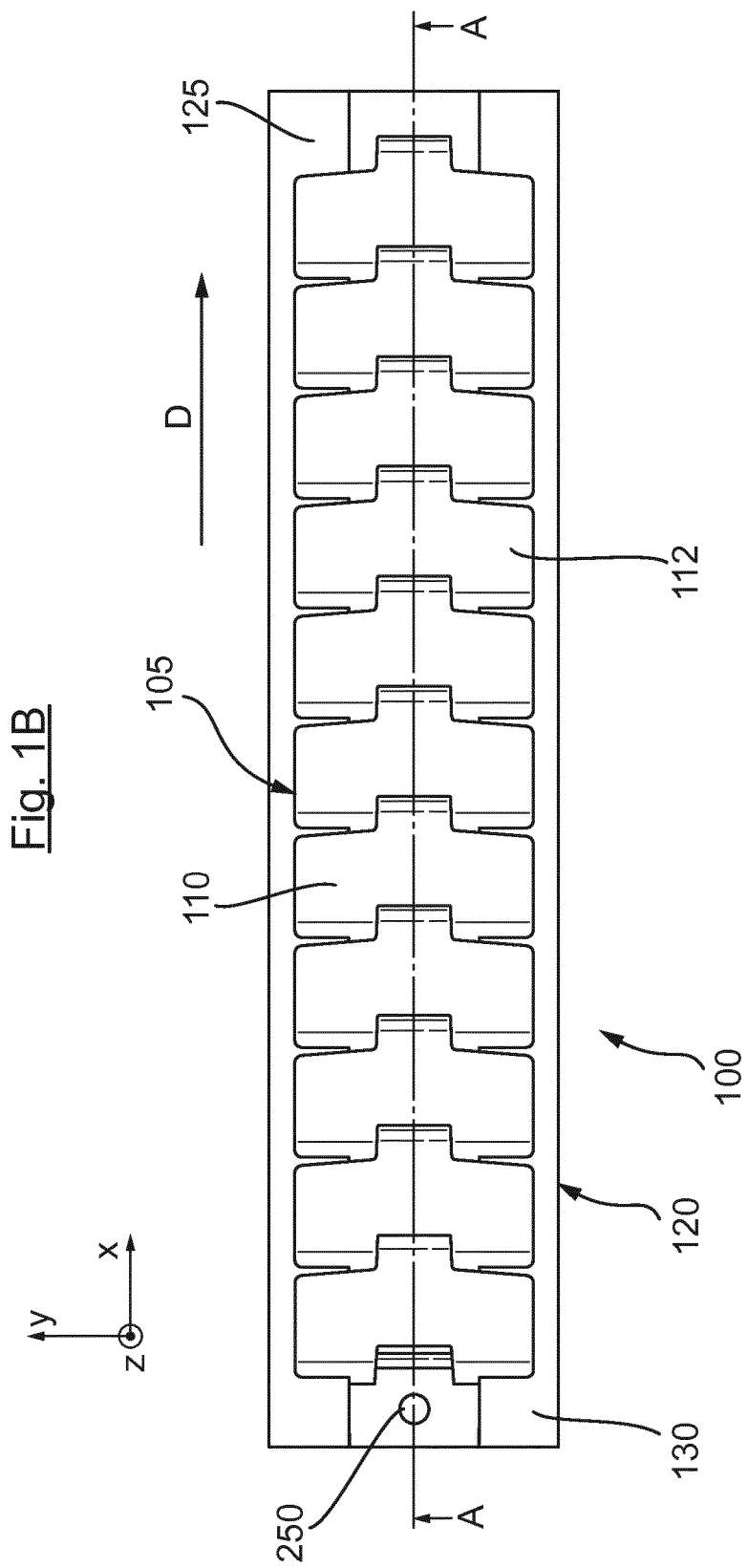

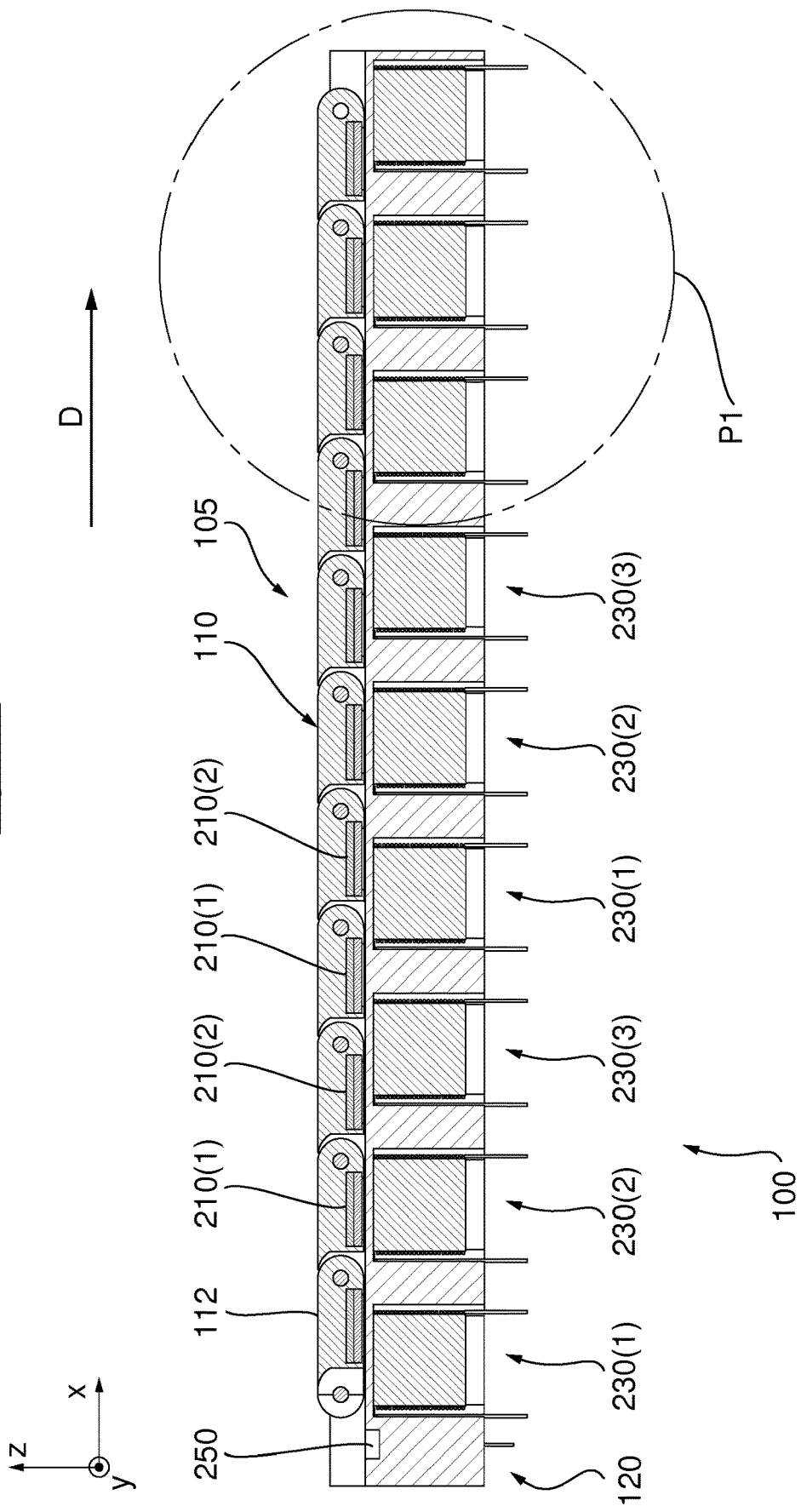

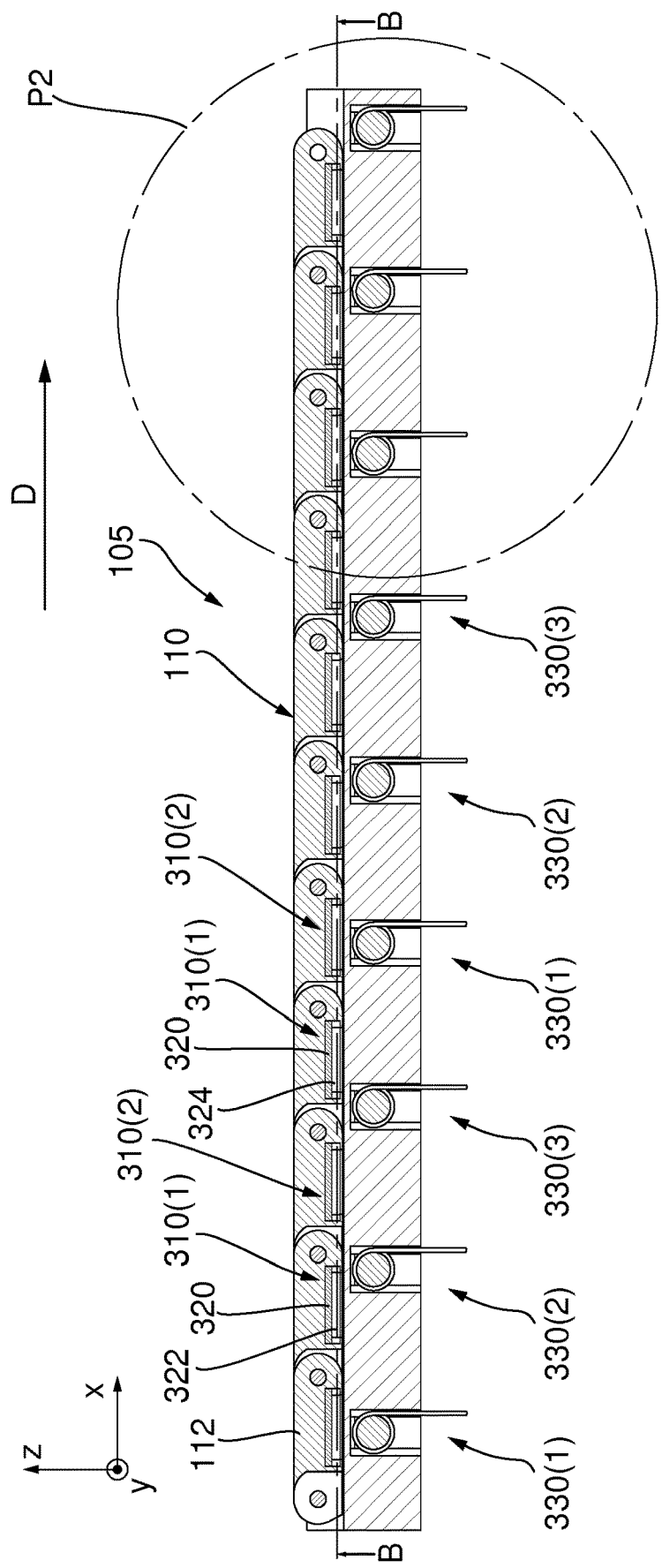

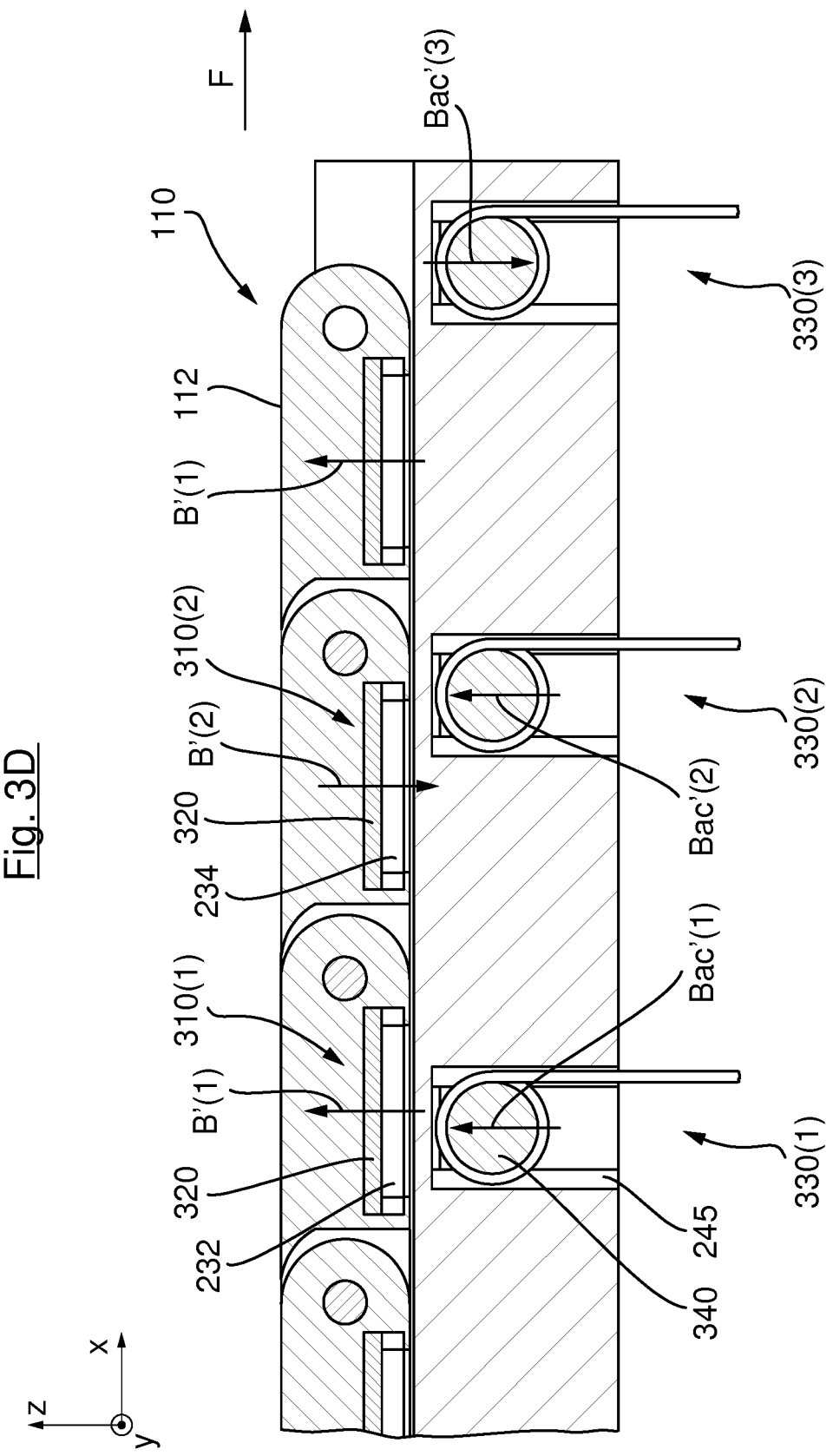

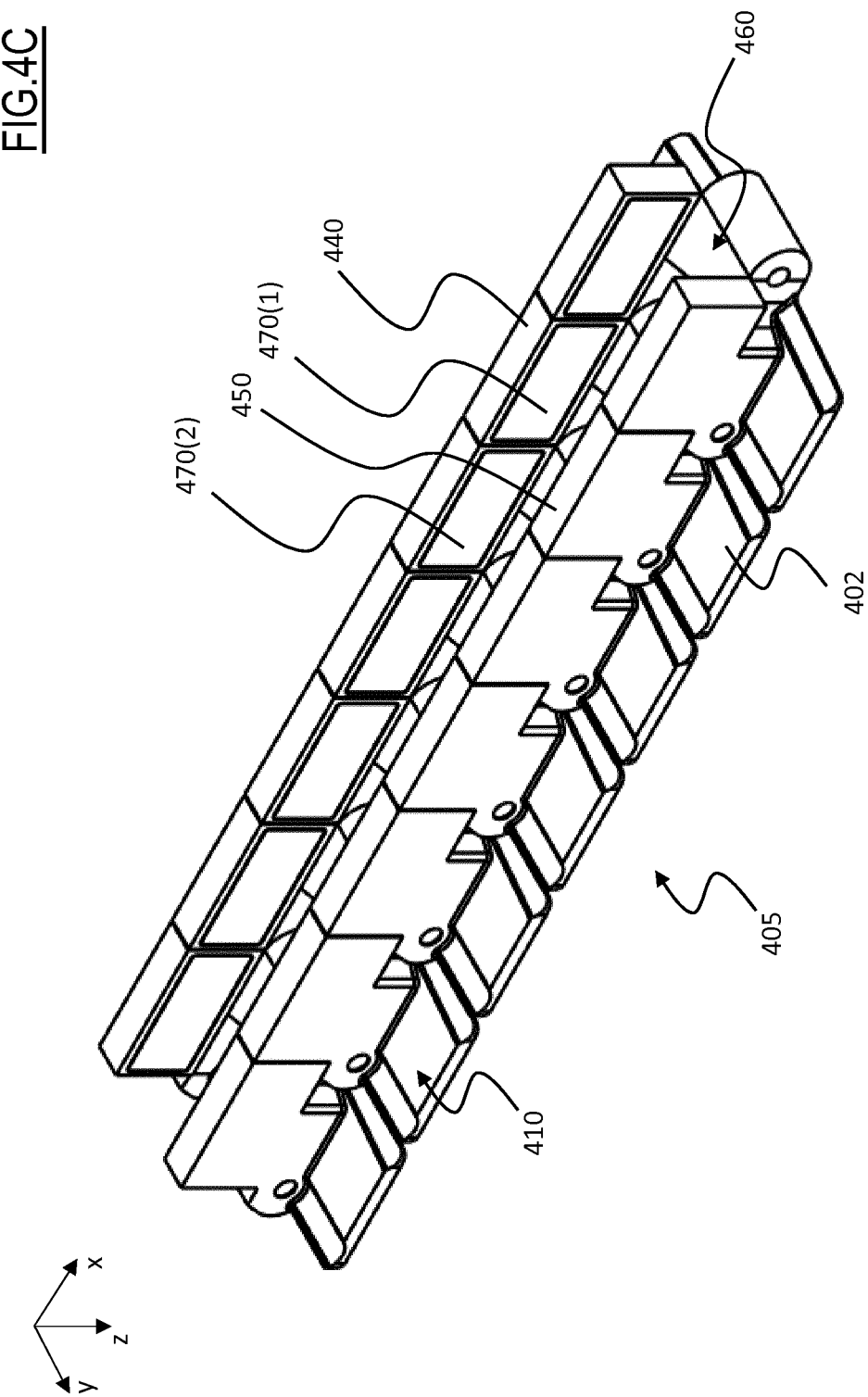

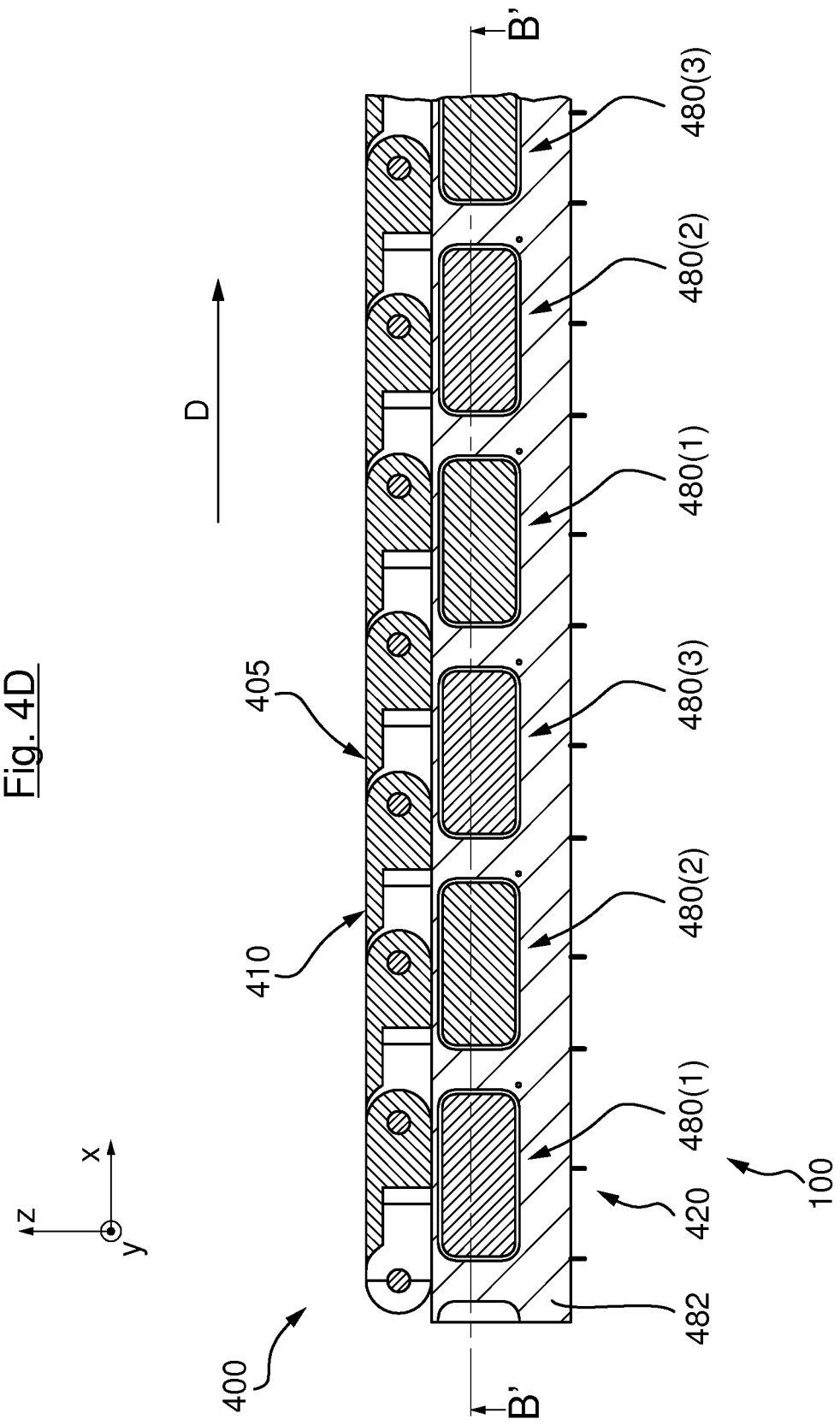

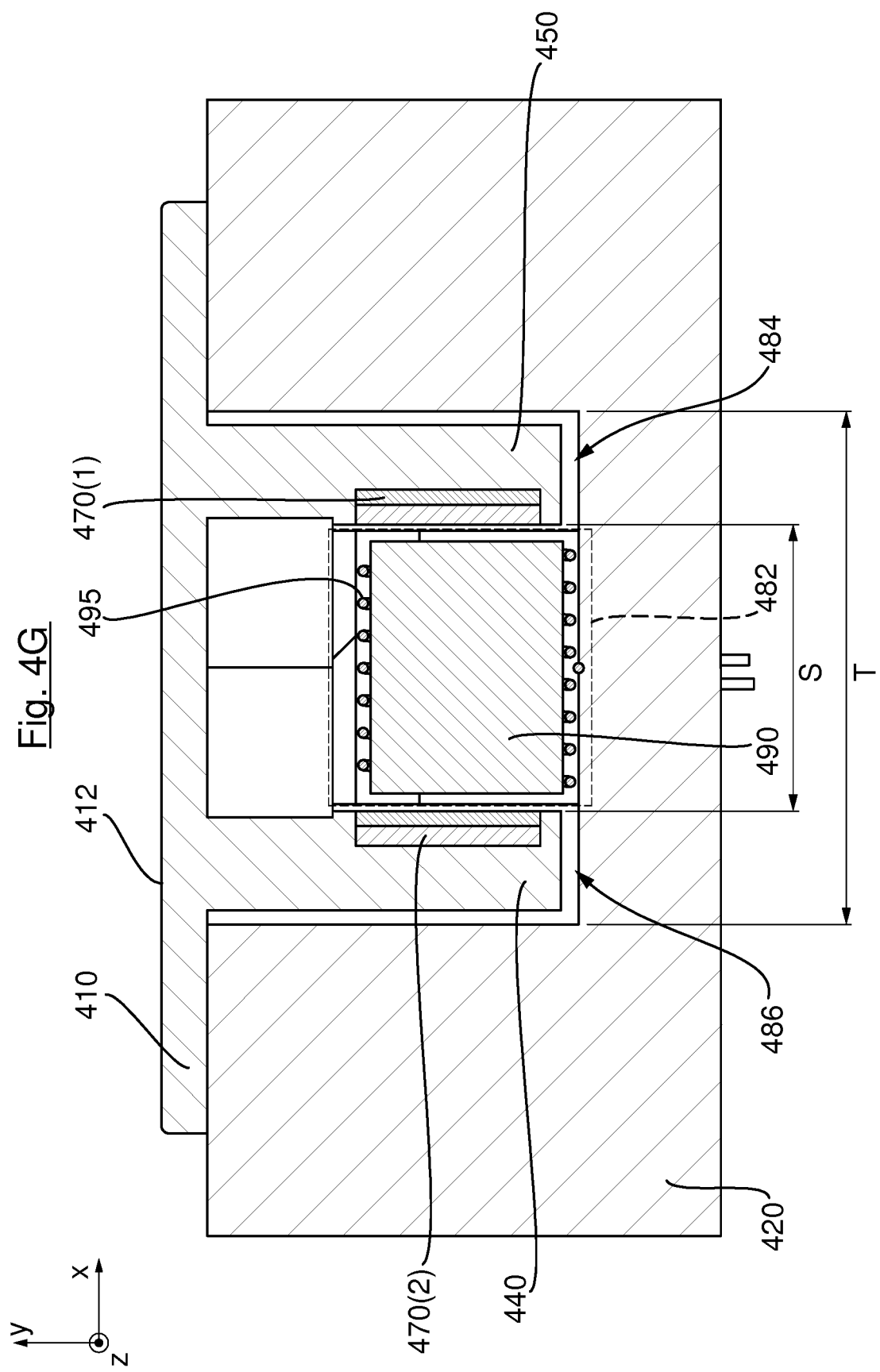

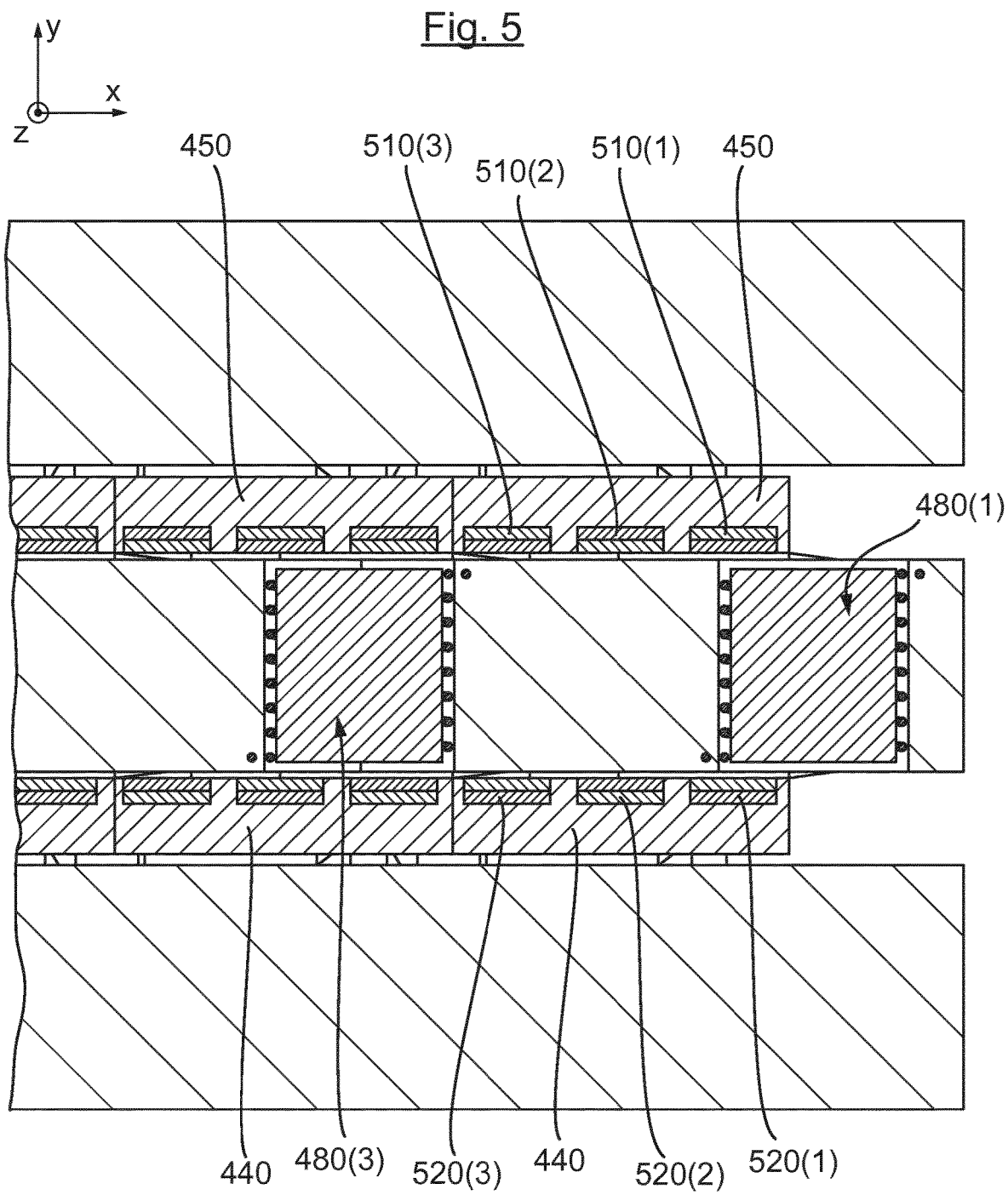

CONVEYOR OF ARTICLES

CROSS-REFERENCE TO RELATED APPLICATIONS

This application represents the national stage entry of PCT International Application No. PCT/EP2019/051723 filed on Jan. 24, 2019, which claims priority to Italian Patent Application IT 102018000001907 filed on Jan. 25, 2018, each of these applications is hereby incorporated herein by reference for all purposes.

The solution according to one or more embodiments of the present invention generally relates to article conveyor systems. More specifically, the solution refers to a conveyor system of the chain-type.

Among the various types of known article conveyor system—in short, conveyor systems—the conveyor systems of the chain type—in short, chain conveyor systems— comprise a transport chain designed to support items, and motor elements to move the transport chain along a predefined path. Typically, the motor elements, or so-called drive, comprise a motor and drive elements, in particular a drive train. The motor is usually arranged to drive the transport chain, or so-called conveyor, via the drive train in a conveying direction.

The transport chain comprises a sequence of chain links coupled to each other. Each chain link comprises a substantially planar face adapted to support articles to be transported. The transport chain is supported by a guide structure, preferably made of a material with a low friction coefficient, so as to be able to slide with respect to the latter.

Typically, the motor means, in particular motor elements or so-called drive, comprise an electric motor adapted to rotate and/or drive, e.g. by means of or via a speed reducer, a pinion having teeth configured to engage directly in corresponding recesses provided on the chain links. In this way, the rotation of the drive axle translates into a consequent translational movement of the transport chain with respect to the guide structure.

Although the motor means, in particular motor elements or so-called drive, of the type comprising a gear reducer, or so-called speed reducer or simply reducer, and pinion are currently used in most of the conveyor systems, they are nevertheless affected by non-negligible drawbacks. For example, the mechanical coupling between the teeth of the pinion and the recesses provided on the chain links can impede the fluidity of the resulting movement of the transport chain, causing a disadvantageous advancement of the transport chain which could cause the fall of the articles to be transported in the presence of high loads, and/or may cause articles being transported to topple over, in particular in the presence of high loads. In addition, the hinges that hinge the chain links are subjected to a not negligible wear due to the friction which is established between hinge pins and corresponding seats. Finally, a system of this type is particularly sensitive to the accumulation of dirt.

The underlying problem of the present invention is therefore to provide an alternative to the motor means, in particular motor elements or so-called drive, comprising a reducer and pinion currently used in the chain conveyor systems, which is not affected by the aforementioned drawbacks.

In very general terms, the solution according to one or more embodiments of the present invention is based on the idea of driving the transport chain in motion by means of a linear electric motor, or so-called linear motor or simply motor, comprising permanent magnets located in the chain links and electromagnets located on the guide structure.

An aspect of the present invention relates to a conveyor system. The conveyor system comprises:
 at least one transport chain comprising a sequence of interconnected chain links;
 a guide structure for slidingly supporting said at least one transport chain so that chain links of the at least one transport chain define a substantially flat support surface for supporting articles to be transported, and
 a motor for causing the at least one transport chain to move with respect to the guide structure along a first direction parallel to said support surface.

According to an embodiment of the present invention, the motor means, or simply motor, comprise(s) an electric linear motor comprising a plurality of magnets each one located in a respective chain link, and a plurality of propulsion electromagnets located on the guide structure.

According to an embodiment of the present invention, each magnet is configured to generate a constant magnetic field along a second direction perpendicular to said first direction.

According to an embodiment of the present invention, each propulsion electromagnet is configured to be energized in such a way to generate a variable magnetic field along the second direction in such a way to generate a magnetic force along said first direction to cause said movement along the first direction of the at least one transport chain along said first direction.

According to an embodiment of the present invention, the plurality of propulsion electromagnets comprises a sequence of propulsion electromagnets along said first direction.

According to an embodiment of the present invention, said second direction is perpendicular to said support surface.

According to an embodiment of the present invention, the plurality of magnets define a sequence of magnets comprising an alternation of first magnets and second magnets.

According to an embodiment of the present invention, each first magnet and each second magnet has the north pole thereof and the south pole thereof that are aligned along the second direction.

According to an embodiment of the present invention, each first magnet has the north pole thereof that is closer to the support surface than the south pole thereof. In particular, each first magnet has its north pole positioned closer to the centerline of the support surface than its south pole. In other words, each first magnet has its north pole positioned more inwardly with respect to the centerline of the support surface and its south pole positioned more outwardly with respect to the centerline of the support surface.

According to an embodiment of the present invention, each second magnet has the south pole thereof that is closer to the support surface than the north pole thereof. In particular, each second magnet has its south pole positioned closer to the centerline of the support surface than its north pole. In other words, each second magnet has its south pole positioned more inwardly with respect to the centerline of the support surface and its north pole positioned more outwardly with respect to the centerline of the support surface.

According to an embodiment of the present invention, each propulsion electromagnet comprises a coil having the symmetry axis thereof which is along the second direction.

According to an embodiment of the present invention, the plurality of magnets define a sequence of magnets comprising an alternation of first magnets and second magnets.

According to an embodiment of the present invention, each first magnet and each second magnet is a u-shaped magnet in which the north pole thereof and the south pole thereof are aligned along a third direction perpendicular to said first and to said second directions.

According to an embodiment of the present invention, the mutual position along the third direction of the north pole and the south pole of each first magnet being opposite than the mutual position along the third direction of the north pole and the south pole of each second magnet.

According to an embodiment of the present invention, each propulsion electromagnet comprises a coil and a respective u-shaped ferritic or ferromagnetic member comprising a first and second arms extending along the second direction and a joining portion joining the first and second arms and extending along the third direction, wherein each coil is coiled onto the joining portion of the u-shaped member.

According to an embodiment of the present invention, each said second direction is parallel to said support surface.

According to an embodiment of the present invention, each chain link comprises a first set of magnets and a second set of magnets.

According to an embodiment of the present invention, each magnet of the first set of the link is faced toward a respective magnet of the second set of the link along said second direction.

According to an embodiment of the present invention, the propulsion electromagnets are located on the guide structure between the magnets of the first set and the magnet of the second set.

According to an embodiment of the present invention, each propulsion electromagnet comprises a coil having the symmetry axis along the second direction.

According to an embodiment of the present invention, said first set consists of a single magnet and said second set consists of a single magnet.

According to an embodiment of the present invention, said first set comprises three magnets and said second set comprises three magnets.

According to an embodiment of the present invention, each magnet is a neodymium-based permanent magnet.

According to an embodiment of the present invention, each magnet is buried in the respective chain link.

According to an embodiment of the present invention the conveyor system further comprise an electric supply system for energizing the propulsion electromagnets.

According to an embodiment of the present invention said electric supply system is a three-phase supply system.

According to an embodiment of the present invention said electric supply system is a two-phase supply system.

According to an embodiment of the present invention said electric supply system is a mono-phase supply system.

According to an embodiment of the present invention the conveyor system further comprises means for sensing the magnetic field generated by the magnets, and means for assessing the position and/or the movement speed of the at least one transport chain based on the sensed magnetic field.

According to an embodiment of the present invention, said at least one transport chain comprises a closed-loop transport chain.

According to an embodiment of the present invention each one of said at least one transport chain is a chunk of transport chain separated from the other chunks.

These and other features and advantages of the solution according to the present invention will be better understood by reading the following detailed description of an embodiment thereof, provided only as a non-limiting example, to be read in combination with the accompanying drawings, in which:

FIG. 1B is a top view of the section of the conveyor of articles of FIG. 1A;

FIG. 2A is a section view of the conveyor of articles along a section plane perpendicular to the support surface in accordance with an embodiment of the present invention;

FIG. 3A is a sectional view of the conveyor of articles along a section plane perpendicular to the support surface according to another embodiment of the present invention;

FIG. 3D is an enlarged view of a portion of FIG. 3A;

FIG. 4C is an isometric view of the transport chain of the conveyor of articles of FIG. 4A and FIG. 4B in accordance with an embodiment of the present invention;

FIG. 4D is a sectional view of the conveyor of articles of FIG. 4A and FIG. 4B along a section plane perpendicular to the support surface according to an embodiment of the present invention;

FIG. 4G is a section view of the conveyor of articles of FIG. 4A and FIG. 4B along a section plane perpendicular to the support surface according to an embodiment of the present invention;

FIG. 5 is a section view of the conveyor of articles of FIG. 4A and FIG. 4B along a section plane parallel to the support surface in accordance with a further embodiment of the present invention.

Figure 1A:
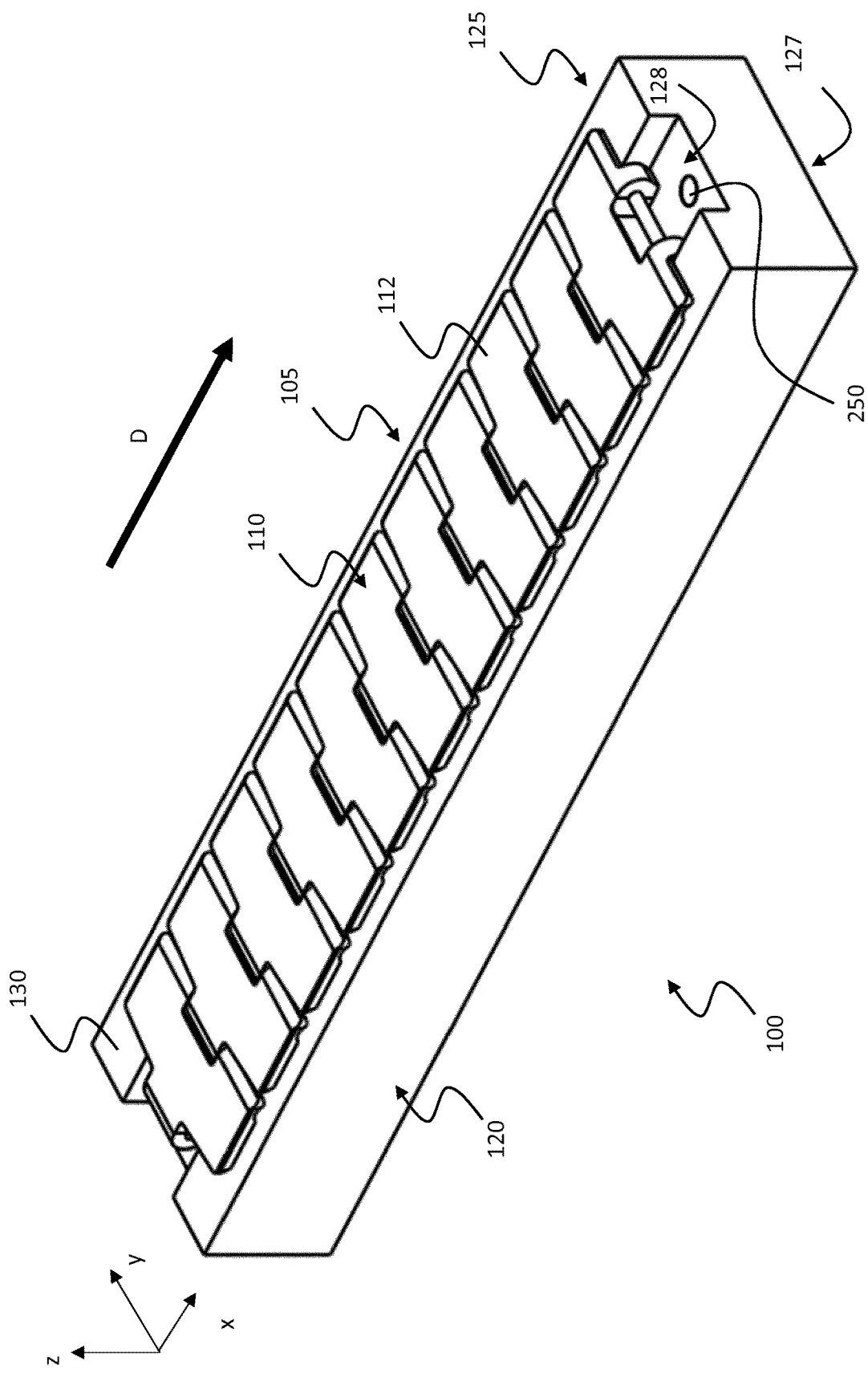
FIG. 1A represents by means of an isometric view through a short section of a conveyor of articles in which solutions in accordance with one or more embodiments of the present invention may be applied.

Referring in particular to the figures, which all share the same reference system identified by the three orthogonal directions x, y and z, in FIG. 1A it is schematically represented by means of an isometric view a short section of an article conveyor system, or simply conveyor of articles, 100 wherein solutions according to one or more embodiments of the present invention can be applied. FIG. 1B is a top view (parallel to the x and y directions) of the section of the conveyor of articles 100 of FIG. 1A.

The conveyor of articles 100 is a conveyor of the chain type, comprising a transport chain 105 for transporting articles, such as for example beverage bottles (mineral water, soft drinks and the like), not shown in the figure. However, it emphasizes that the type of conveyor, and the nature of the articles it is intended to convey, are not limiting for the purposes of the present invention, which generally applies to any type of conveyor, regardless of the nature of the articles to be conveyed.

The transport chain 105 can be generally constituted by a plurality of chain chunks, each of which is in turn made up of a plurality of chain links 110, for example made of plastic material, hinged one to one another by means of pins.

Each chain link 110 comprises a first substantially flat face 112 and a second face (not visible in FIGS. 1A and 1B) opposite to the first face. The first faces 112 of the chain links 110 are adapted to define a support surface which is substantially flat (parallel to the x and y directions) and/or smooth for supporting the articles to be transported.

It is emphasized that FIGS. 1A and 1B show only a portion of the transport chain 105, for example corresponding to a single chain chunk. The complete transport chain 105 may instead be much longer, and also form a closed loop comprising a forward section, or so-called top run, in which the first faces 112 of the chain links 110 face upwards so as to define the support surface (as shown in FIGS. 1A and 1B), and a return section, or so-called bottom run, (not visible in FIGS. 1A and 1B) located in an underlying portion of the conveyor, wherein the first faces 112 of the chain links 110 face downwards.

The transport chain 105 is slidingly supported by a guide structure 120. In the embodiment illustrated in the figures, the guide structure has a substantially parallelepiped shape comprising an upper surface 125 and a smaller surface 127 parallel to the directions x, y. A guide groove 128 extending longitudinally along a direction parallel to the direction x is made in the upper surface 125 of the guide structure 120, which guide groove 128 defines lateral guide profiles 130 made of a low friction coefficient material on which the transport chain 105 slidingly rests.

The conveyor of articles 100 comprises motor means, or so-called linear motor, for imparting movement to the transport chain 105 with respect to the guide structure 120. In use, the transport chain 105 slides with respect to the guide structure 120 along a movement direction D defined by the guide groove 128. In the case shown in the figures, the movement direction D is therefore parallel to the x direction.

In accordance with an embodiment of the present invention, the motor means, or simply the motor, include a linear electric motor comprising permanent magnets located in the chain links 110 of the transport chain 105 and electromagnets—called "propulsion electromagnets"—located in the guide structure 120.

Figure 2B:
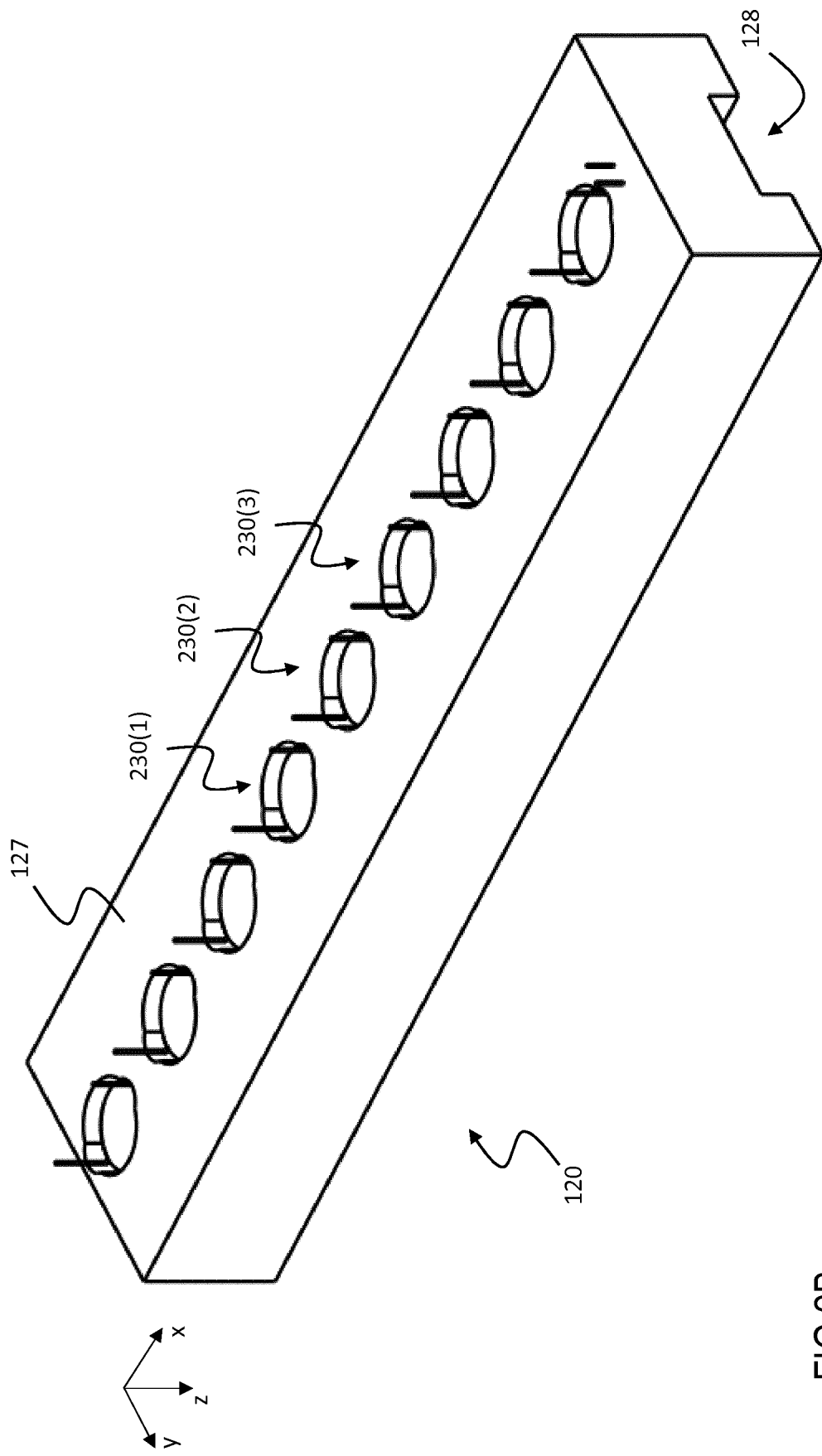
FIG. 2B is an isometric view of the guide structure of the conveyor of articles of FIG. 2A, in which the transport chain has been removed.
Figure 2C:
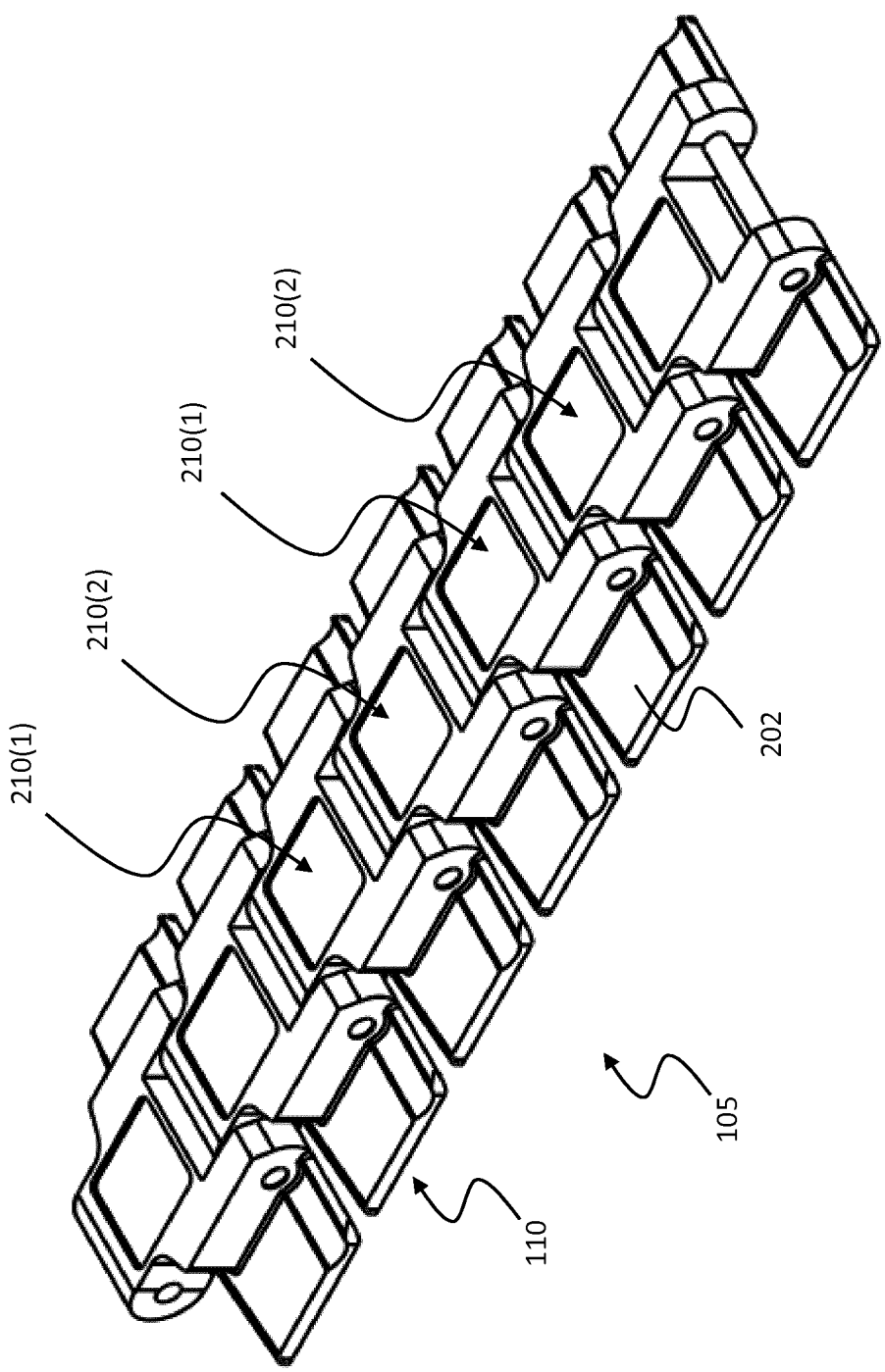
FIG. 2C is an isometric view of the transport chain of the conveyor of articles of FIG. 2A.
Figure 2D:
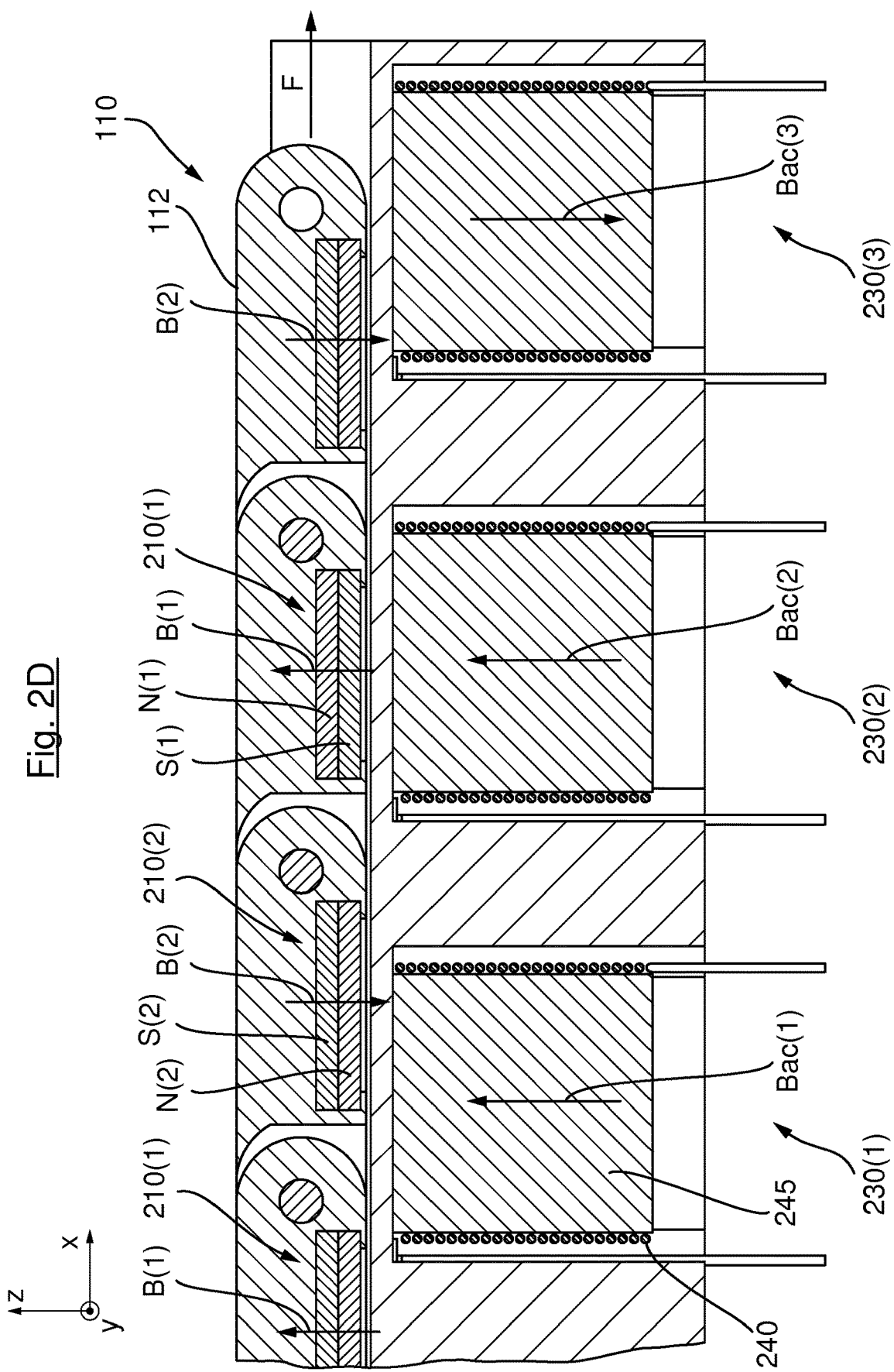
FIG. 2D is an enlarged view of a portion of FIG. 2A.

In order to show in detail the motor means, or so-called linear motor, according to an embodiment of the present invention, reference will now be made to FIGS. 2A-2D. FIG. 2A is a sectional view of the conveyor of articles 100 along a section plane perpendicular to the support surface and passing through the axis A-A of FIG. 1B. FIG. 2B is an isometric view of the guide structure 120 upside down, that is where the lower surface 127 is seen, and where the transport chain 105 has been removed. FIG. 2C is an isometric view of the transport chain 105 upside down—that is, in which the lower faces (identified with 202) of the chain links 110 opposite to the first faces 112 are visible. FIG. 2D is an enlarged view of the portion of FIG. 2A identified with the reference P1.

In accordance with the embodiment of the present invention illustrated in FIGS. 2A-2D, each chain link 110 comprises a respective permanent magnet, or simply "magnet", configured to generate a constant magnetic field along a direction substantially perpendicular to the support surface, i.e., along the z direction. For example, the magnets can be neodymium-based permanent magnets. Naturally, the concepts of the present invention can also be applied to cases in which the magnets are formed with different materials, such as metallic materials or composite materials.

According to an embodiment of the invention, the magnets define along the movement direction D of the chain a sequence of magnets comprising an alternation of first magnets 210(1) and second magnets 210(2).

According to the embodiment of the invention illustrated in FIGS. 2A-2D, the first magnets 210(1) and the second magnets 210(2) have their magnetic north poles and magnetic south poles aligned along the z direction. Each of the first magnets 210(1) has the north pole N(1) which is closer to the first face 112 of the chain link 110—and therefore to the support surface—with respect to the south pole S(1). Each of the second magnets 210(2) has the south pole S(2) which is closer to the first face 112 of the chain link 110—and therefore to the support surface—with respect to the north pole N(2).

In this way, as visible in FIG. 2D the magnetic fields generated by the sequence of magnets 210(1), 210(2) provide for an alternation of magnetic fields B(1)—generated by magnets 210(1)—and magnetic fields B(2)—generated by magnets 210(2)—opposite to each other.

In accordance with the embodiment of the present invention illustrated in FIGS. 2A-2D, the propulsion electromagnets are configured to be energized so as to generate a variable-intensity oscillating magnetic field along a direction substantially perpendicular to the support surface, that is parallel to the direction z.

According to an embodiment of the present invention, the propulsion electromagnets are located in the guide structure 120 and define along the movement direction D of the chain a sequence of propulsion electromagnets comprising an alternation of first propulsion electromagnets 230(1), second propulsion electromagnets 230(2) and third propulsion electromagnets 230(3) in which each first propulsion electromagnet 230(1) is followed by a second propulsion electromagnet 230(2) and each second propulsion electromagnet 230(2) is followed by a third propulsion electromagnet 230(3).

In accordance with the embodiment of the invention illustrated in FIGS. 2A-2D, each of the propulsion electromagnets 230(1), 230(2), 230(3) of the sequence comprises a coil 240 wound around a core 245 of ferritic or ferromagnetic material and having a main axis perpendicular to the support surface, that is parallel to the z direction.

According to an embodiment of the present invention, the propulsion electromagnets 230(1), 230(2), 230(3) are powered by a three-phase electric system which provides that each propulsion electromagnet 230(1) is powered by an alternating electric current having frequency f which has a difference of phase of 120° with respect to the alternating current having frequency f which supplies each propulsion electromagnet 230(2) and a difference of phase of 240° with respect to the alternating current having frequency f which supplies each propulsion electromagnet 230(3).

In this way, as shown in FIG. 2D, the magnetic fields generated by the sequence of propulsion electromagnets 230(1), 230(2), 230(3) provide for an alternation of oscillating magnetic fields Bac(1)—generated by the propulsion electromagnets 230(1), Bac(2)—generated by the propulsion electromagnets 230(2)—and Bac(3)—generated by the propulsion electromagnets 230(3)—being reciprocally phase shifted by ±120°.

Without going into details known to experts in the field of linear electric motors, the alternation of constant magnetic fields B(1), B(2) parallel to the z direction, and the alternation of oscillating magnetic fields Bac(1), Bac(2), Bac(3) parallel to the z direction cause the generation of a magnetic force F parallel to the x direction, which pushes the transport chain 105 along the movement direction D, thus making it possible the movement of the transport chain 105 with respect to the guide structure 120. It is emphasized that the magnetic force F so generated is distributed along the movement path, and not concentrated in a single application point. Each chain link 110 is in fact subjected to a simultaneous push action—caused by the magnetic field generated by one or more propulsion electromagnets 230(1), 230(2), 230(3) positioned upstream of the chain link 110—and traction action—caused by the magnetic field generated by one or more propulsion electromagnets 230(1), 230(2), 230(3) positioned downstream of the chain link 110. The mutual distances between each propulsion electromagnet 230(1), 230(2), 230(3), the mutual distances between the magnets 210(1), 210(2), the distances between the propulsion electromagnets 230(1), 230(2), 230(3) and the magnets 210(1), 210(2), as well as the intensities of the oscillating magnetic fields Bac(1), Bac(2), Bac(3) and of the constant magnetic fields B(1), B(2) are properly selected so that the push and traction actions the chain links 100 are subjected to do not cause unwanted lifting (along the z direction) of the transport chain 105 with respect to the guide structure 120.

In accordance with a preferred embodiment of the present invention in which the chain links 110 are generated by means of plastic material molding, the housing of the magnets 210(1), 210(2) in the chain links 110 is obtained by embedding ferromagnetic elements into the molten plastic material during the molding phase of the chain links 110 and then magnetizing these ferromagnetic elements at a later time. In this way, the magnets 210(1), 210(2) are encapsulated within the chain links 110 themselves, avoiding the formation of interstices and cracks within which dirt accumulation can occur. Furthermore, in this way the magnets 210(1), 210(2) will be defended from the chemical aggression typical of working environments of particular applications.

In the particular constructive configuration with embedded magnets, it is advisable to magnetize the ferromagnetic elements only after they have been drowned and/or immersed in the molten plastic and the chain links have already been connected to each other. In this way the demagnetization of the ferromagnetic elements will be avoided when they are subjected to high temperatures when immersed in melted thermoplastic resins. Magnetizing the already concatenated hinge elements with alternate polarization will also result to be easy.

However, embodiments are also possible in which the magnets 210(1), 210(2), are embedded within the chain links 110, for example inserted in appropriate niches made in the chain links 110 themselves. It will be possible to seal the niche housing the permanent magnet with suitable cold resin coating both to protect it from environmental agents and to ensure the stability of the coupling to the chain hinge.

With respect to the traditional chain conveyors provided with motor means, in particular motor elements, comprising a reducer and a pinion, the chain conveyor of articles 100 just described allows the transport chain 105 to move on the guide structure 120 in a more fluid manner, since no toothed coupling is present. Moreover, the absence of toothed couplings and of high stresses on the hinges meshing on the traction pinions, results in a reduction in the wear the chain links 110 are subjected to, and makes the conveyor of articles 100 less prone to the production of dust, squeaking and breaking due to the reaching of fatigue limits of the plastic material.

Although in the embodiment of the present invention described in the preceding figures, each chain link 110 comprises a respective magnet 210(1) or 210(2), similar considerations apply when the magnets 210(1), 210(2) are provided in some chain links 110 only, for example on alternate chain links 110.

The concepts of the present invention can also be applied in the case in which the propulsion electromagnets 230(1), 230(2), 230(3) have a structure that is different from the described one, provided that they are capable of generating oscillating magnetic fields Bac(1), Bac(2), Bac(3) perpendicular to the support surface.

Moreover, although in the described solution the propulsion electromagnets have been described to be supplied by means of a three-phase electrical system, the concepts of the present invention can also be applied to the cases with power supplying through two-phase or single-phase electrical systems.

In accordance with an embodiment of the present invention, the conveyor of articles 100 further comprises magnetic sensing means 250 for detecting the magnetic field B(1), B(2) generated by magnets 210(1), 210(2) during the operation of the conveyor of articles 100. In this way, by monitoring how the detected magnetic field evolves over time, it is possible to deduce useful information on the actual operation of the conveyor of articles 100, such as the current position of the transport chain 105 and its movement speed. For example, according to an embodiment of the present invention, the magnetic sensing means 250 comprise a Hall sensor located in the guide groove 128 so as to be hit by the magnetic fields B(1), B(2) generated by the magnets 210(1), 210(2) as the transport chain 105 slides over it. It is emphasized that if the transport chain is a chain that forms a closed loop, it is sufficient to provide a single Hall sensor (or equivalent sensor), while in the case of several separate chain chunks, in order to be able to monitor the position and the speed of each chunk, the presence of several Hall sensors (or equivalent sensors) distributed along the movement path may be required.

According to an embodiment of the present invention, the conveyor of articles 100 is provided with control means (not shown in the figures) adapted to control the intensity of the current flowing in the coils of the propulsion electromagnets 230(1), 230(2), 230(3)—and then adjusting the resulting magnetic force pushing the transport chain 105—based on information on the effective operation of the conveyor of articles 100 obtained by the magnetic sensing means 250.

A further linear electric motor will now be described which can be used to move the transport chain 105 of the conveyor of articles 100 according to a further embodiment of the present invention.

Figure 3B:
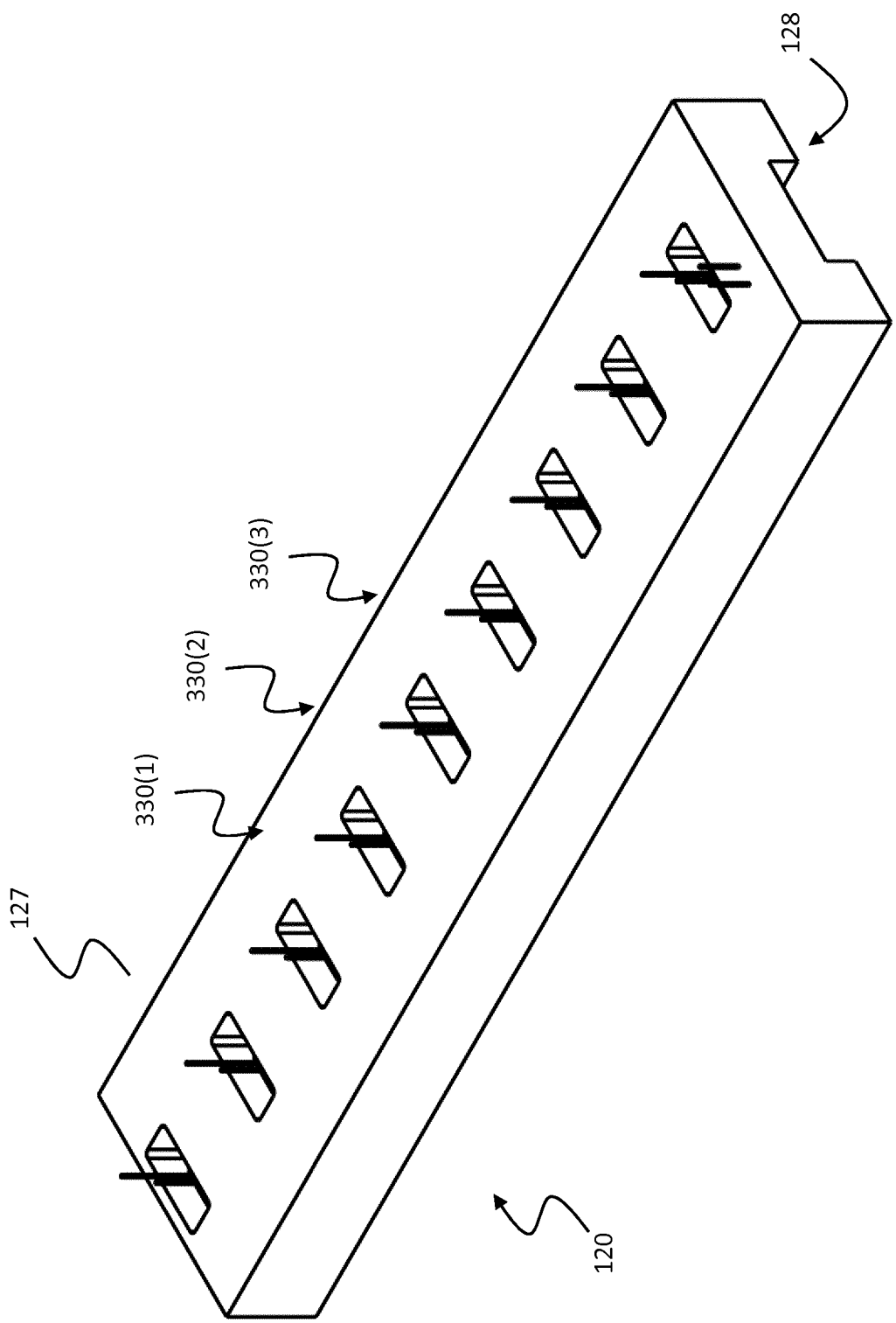
FIG. 3B is an isometric view of the guide structure of the conveyor of articles of FIG. 3A articles, in which the transport chain has been removed.
Figure 3C:
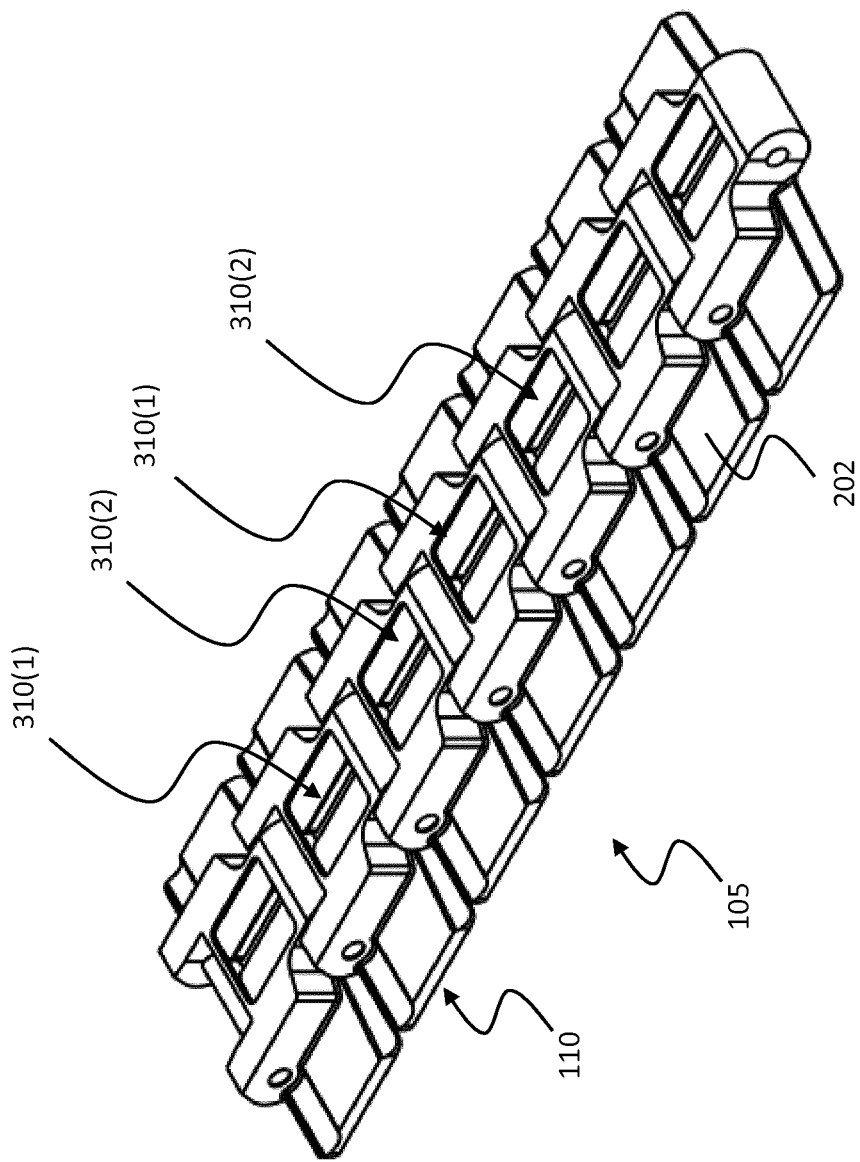
FIG. 3C is an isometric view of the transport chain of the conveyor of articles of FIG. 3A.
Figure 3E:
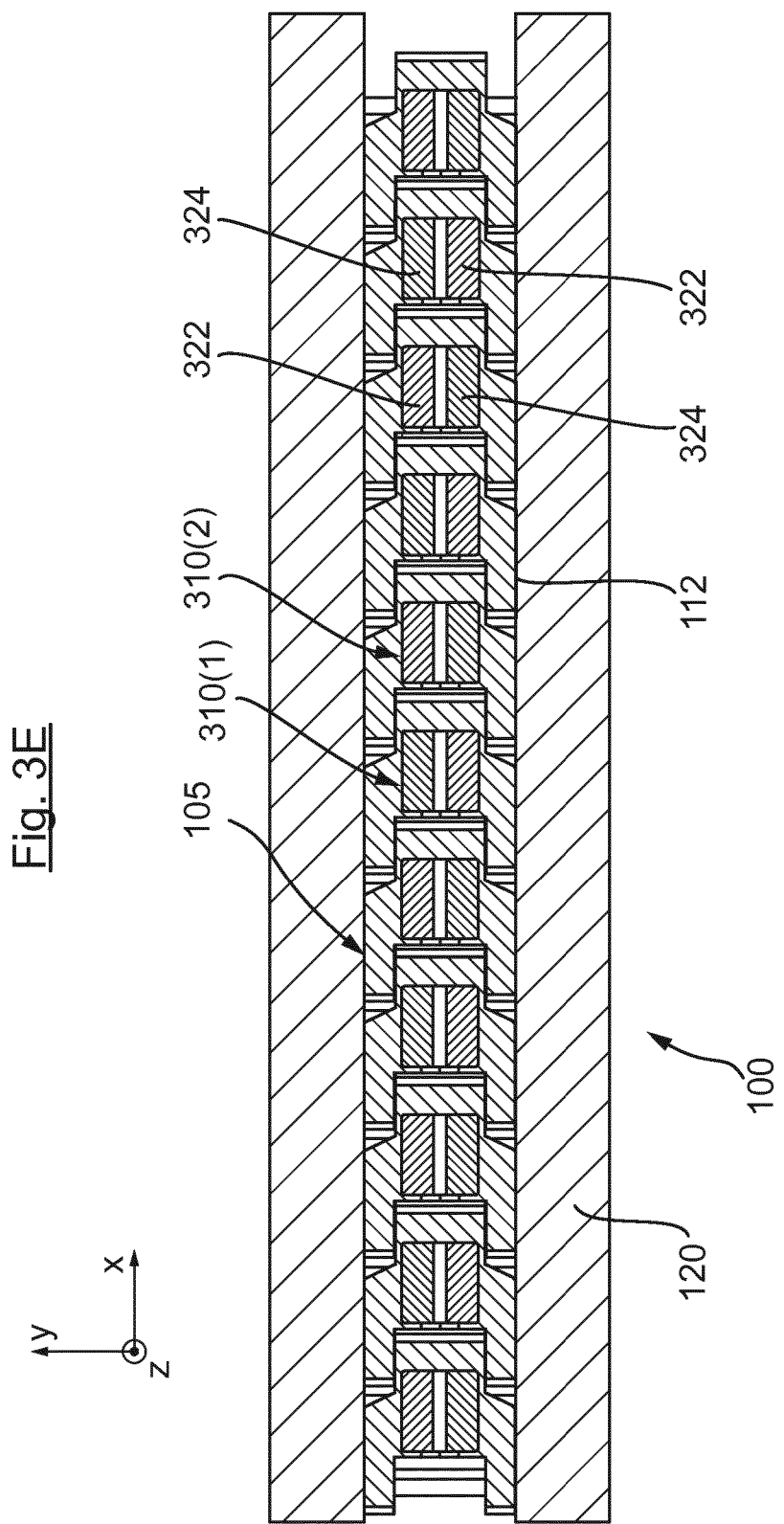
FIG. 3E is a section view of the conveyor of articles of FIG. 3A along a section plane parallel to the support surface that runs through the chain links of the transport chain.
Figure 3F:
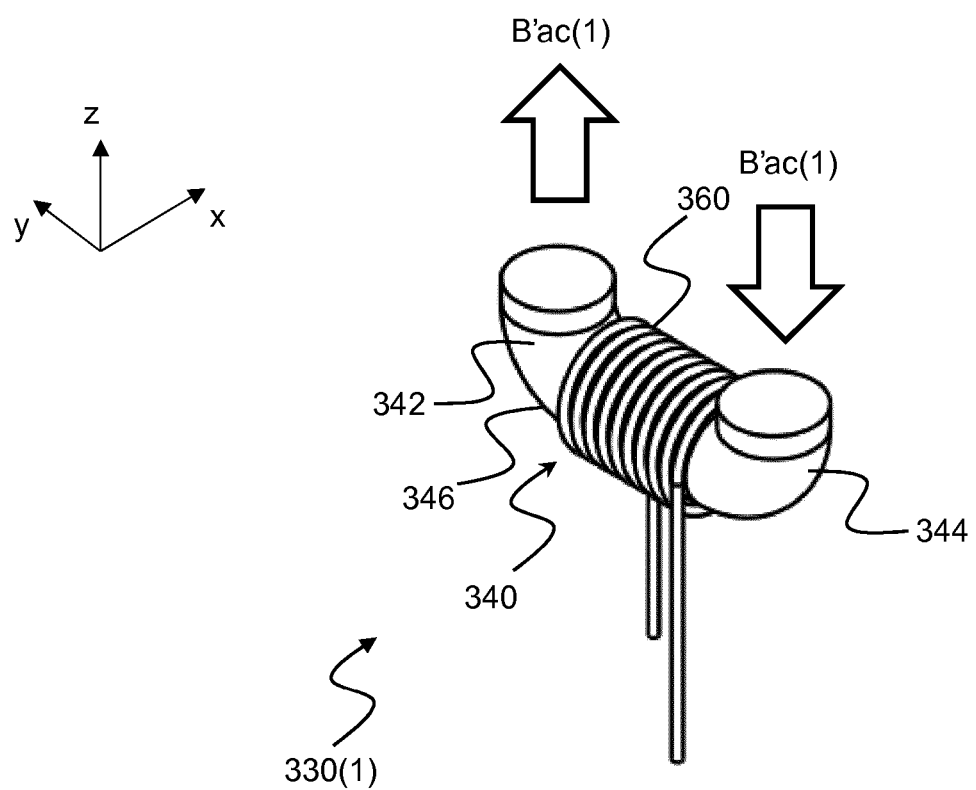
FIG. 3F is an isometric view of one of the propulsion electromagnets located in the guide structure of the conveyor of articles of FIG. 3A.

In order to show in detail the motor means, or so-called linear motor, according to this further embodiment of the present invention, reference will now be made to FIGS. 3A-3F. FIG. 3A is a sectional view of the conveyor of articles 100 along a section plane perpendicular to the support surface and passing through the axis A-A of FIG. 1B. FIG. 3B is an isometric view of the guide structure 120 upside down, i.e., where the bottom surface is visible 127, and where the transport chain 105 has been removed. FIG. 3C is an isometric view of the transport chain 105 upside down—that is, where the lower faces 202 of the chain links 110 opposite to the first faces 112 are visible. FIG. 3D is an enlarged view of the portion of FIG. 3A identified with the reference P2. FIG. 3E is a sectional view of the conveyor of articles 100 along a section plane parallel to the support surface and passing through the axis B-B of FIG. 3A that passes through the chain links 110 of the transport chain 105 along a direction parallel to the direction x. FIG. 3F is an isometric view of one of the propulsion electromagnets located in the guide structure 120.

Unlike the embodiment illustrated in FIGS. 2A-2D, in which the magnets 210(1), 210(2) have their own north and south magnetic poles aligned along the z direction, according to the embodiment of the invention illustrated in FIGS. 3A-3F the magnets define along the movement direction D of the chain a sequence of magnets comprising an alternation of first magnets 310(1) and second magnets 310(2) in which each magnet 310(1), 310(2) is a permanent magnet in the shape of a "u" having the north and south magnetic poles that are aligned along the y direction.

According to an embodiment of the present invention, each magnet 310(1), 310(2) comprises a plate 320 made of iron, or of a low saturation ferritic material, wherein two neodymium-based magnetic elements 322, 324 are connected on the lower surface—i.e., the surface facing the guide structure 120—of the plate 320. Naturally, the concepts of the present invention can also be applied to cases in which the magnetic elements 322, 324 are made of different materials, such as metallic or composite materials. The mutual position along the y direction of the north and south magnetic poles of each first magnet 310(1) is opposite to that of the north and south magnetic poles of each second magnet 310(2).

In this way, as shown in FIGS. 3A and 3D, the magnetic fields generated by the sequence of magnets 310(1), 310(2) in a direction perpendicular to the support surface—that is, parallel to the z direction—provide for an alternation of magnetic fields B'(1)—generated by magnets 310(1)—and magnetic fields B'(2)—generated by magnets 210(2)—opposite to each other.

As in the previous case, also according to the embodiment of the present invention illustrated in FIGS. 3A-3F, the propelling electromagnets are configured to be energized so as to generate an oscillating magnetic field having variable intensity.

The propulsion electromagnets are located in the guide structure 120 and define along the movement direction D of the chain a sequence of propulsion electromagnets comprising an alternation of first propulsion electromagnets 330(1), second propulsion electromagnets 330(2) and third propulsion electromagnets 330(3) in which each first propulsion electromagnet 330(1) is followed by a second propulsion electromagnet 330(2) and each second propulsion electromagnet 330(2) is followed by a third propulsion electromagnet 330(3).

According to the embodiment of the invention illustrated in FIGS. 3A-3F, each of the propulsion electromagnets 330(1), 330(2), 330(3) of the sequence comprises:

a core 340 made of ferritic or ferromagnetic material in the form of a "u" having a first arm 342 and a second arm 344 which extend along a direction parallel to the direction z and a connecting portion 346 between the first arm 342 and the second arm 344 which extends along a direction parallel to the direction y, e a coil 360 wound around the connecting portion 346.

In accordance with an embodiment of the present invention, the propulsion electromagnets 330(1), 330(2), 330(3) are powered by means of a three-phase electrical system which provides that each propulsion electromagnet 330(1) is powered by an alternating electric current having frequency f which has a difference of phase of 120° with respect to the alternating current having frequency f which supplies each propulsion electromagnet 330(2) and a difference of phase of 240° with respect to the alternating current having frequency f which supplies each propulsion electromagnet 330(3).

In this way, as shown in FIGS. 3A, 3D and 3F, the magnetic fields generated by the sequence of propulsion electromagnets 330(1), 330(2), 330(3) provide for an alternation of oscillating magnetic fields Bac'(1)—generated by the propulsion electromagnets 330(1), Bac'(2)—generated by the propulsion electromagnets 330(2)—and Bac'(3)—generated by the propulsion electromagnets 330(3)—being reciprocally phase shifted by ±120°.

Thanks to the presence of the "u" shaped core 340, the resulting oscillating magnetic field generated by each propulsion electromagnet 330(1), 330(2), 330(3) is then directed along a direction parallel to the z direction.

Also in this case, the alternation of constant magnetic fields B'(1), B'(2) parallel to the z direction and the alternation of oscillating magnetic fields Bac'(1), Bac'(2), Bac'(3) parallel to the z direction cause the generation of a magnetic force F parallel to the x direction, which pushes the transport chain 105 along the movement direction D, thus making possible the movement of the transport chain 105 with respect to the driving structure 120.

This embodiment allows obtaining advantages similar to those obtainable with the embodiment previously described with reference to FIGS. 2A-2D. The possible modifications of the embodiment corresponding to FIGS. 2A-2D can be applied as well to the embodiment corresponding to FIGS. 3A-3F.

Figure 4A:
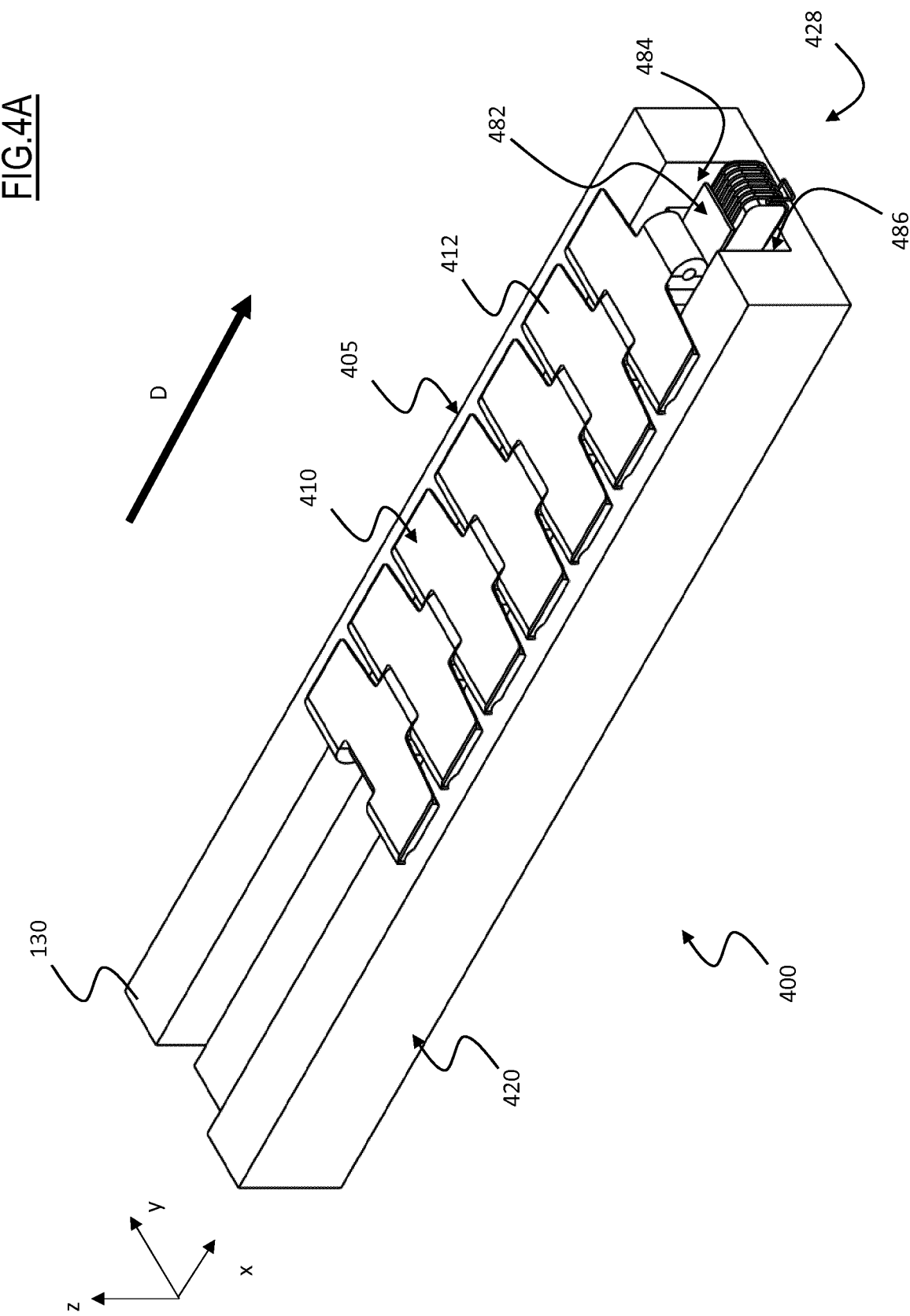
FIG. 4A represents by means of an isometric view a short section of a further article conveyor in which solutions according to one or more further embodiments of the present invention can be applied.
Figure 4B:
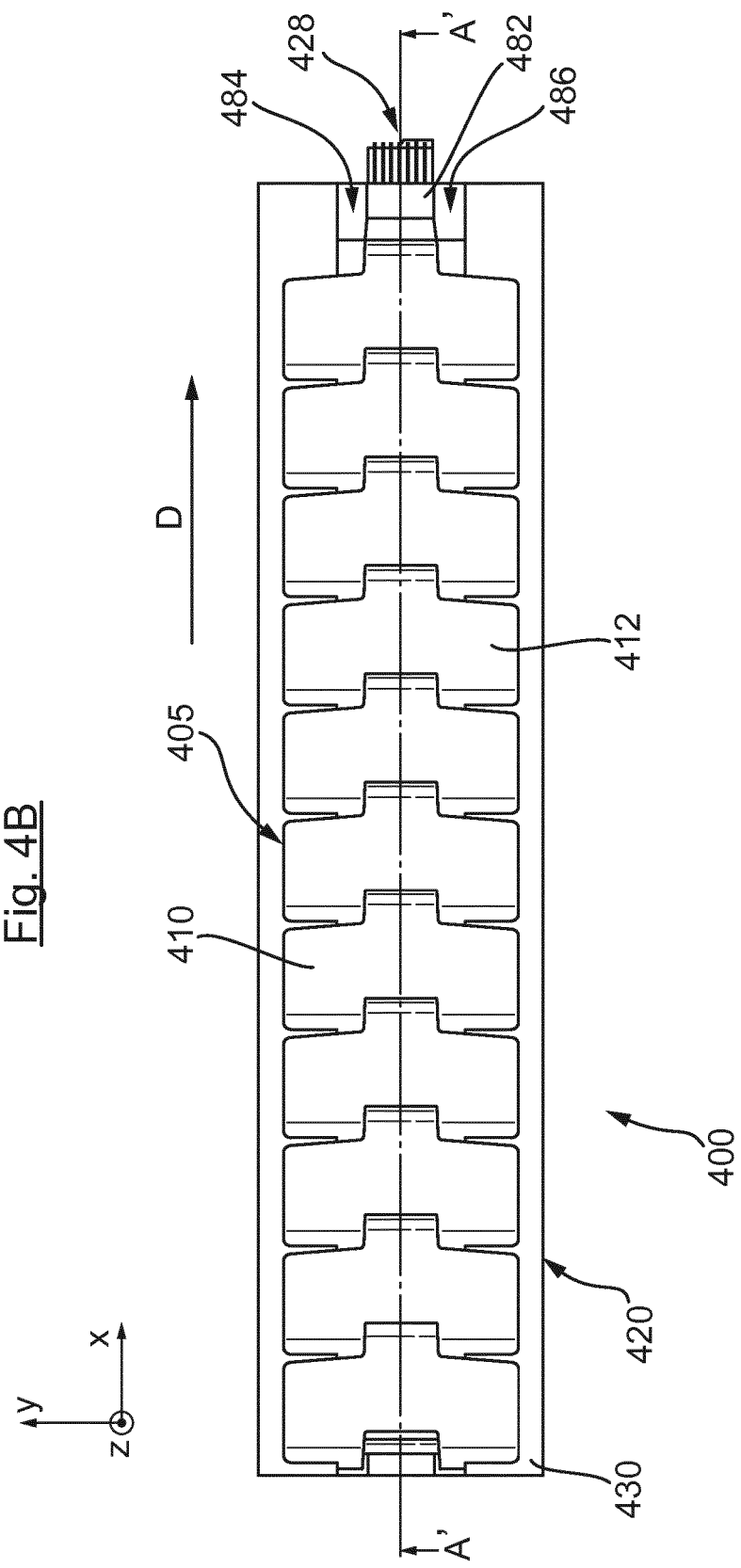
FIG. 4B is a top view of the section of the conveyor of articles of FIG. 4A.

An embodiment of a linear electric motor will now be described with reference to FIGS. 4A-4H, which may be used to move the transport chain of a further conveyor of articles—identified with reference 400—according to a further embodiment of the present invention. A short section of the conveyor of articles 400 is schematically represented in FIG. 4A by an isometric view. FIG. 4B is a top view (parallel to the x and y directions) of the section of the conveyor of articles 400 of FIG. 4A.

In the same way as for the conveyor of article 100 previously described, the conveyor of articles 400 as well is a chain-type conveyor, comprising a transport chain 405 for transporting articles, such as for example beverage bottles (mineral water, soft drinks and similar), not shown in the figure. However, it is emphasized that the type of conveyor, and the nature of the articles it is intended to carry, are not limiting for the purposes of the present invention, which generally applies to any type of conveyor, regardless of the nature of the articles to be transported.

Like the transport chain 105 previously described, also the transport chain 405 can be constituted, in general, by a plurality of chain chunks, each of which is in turn constituted by a plurality of chain links 410, for example made of plastic material, hinged to each other by means of pins. Each chain link 410 comprises a substantially flat first face 412 and a second face opposite the first face.

In a manner equivalent to the transport chain 105 previously described, also the transport chain 405 is slidably supported by a guide structure 420 having a guide groove 428 which longitudinally extends along a direction parallel to the x direction, and defines lateral guide profiles 430 made of a low friction coefficient material on which the transport chain 405 slidingly rests.

As in the embodiments of the invention of the conveyor of articles 100 described above, according to an embodiment of the present invention, the motor means, or so-called linear motor, for imparting movement to the transport chain 405 with respect to the guide structure 420 include a linear electric motor comprising permanent magnets located in the chain links 410 of the transport chain 405, and propulsion electromagnets located in the guide structure 420.

Figure 4E:
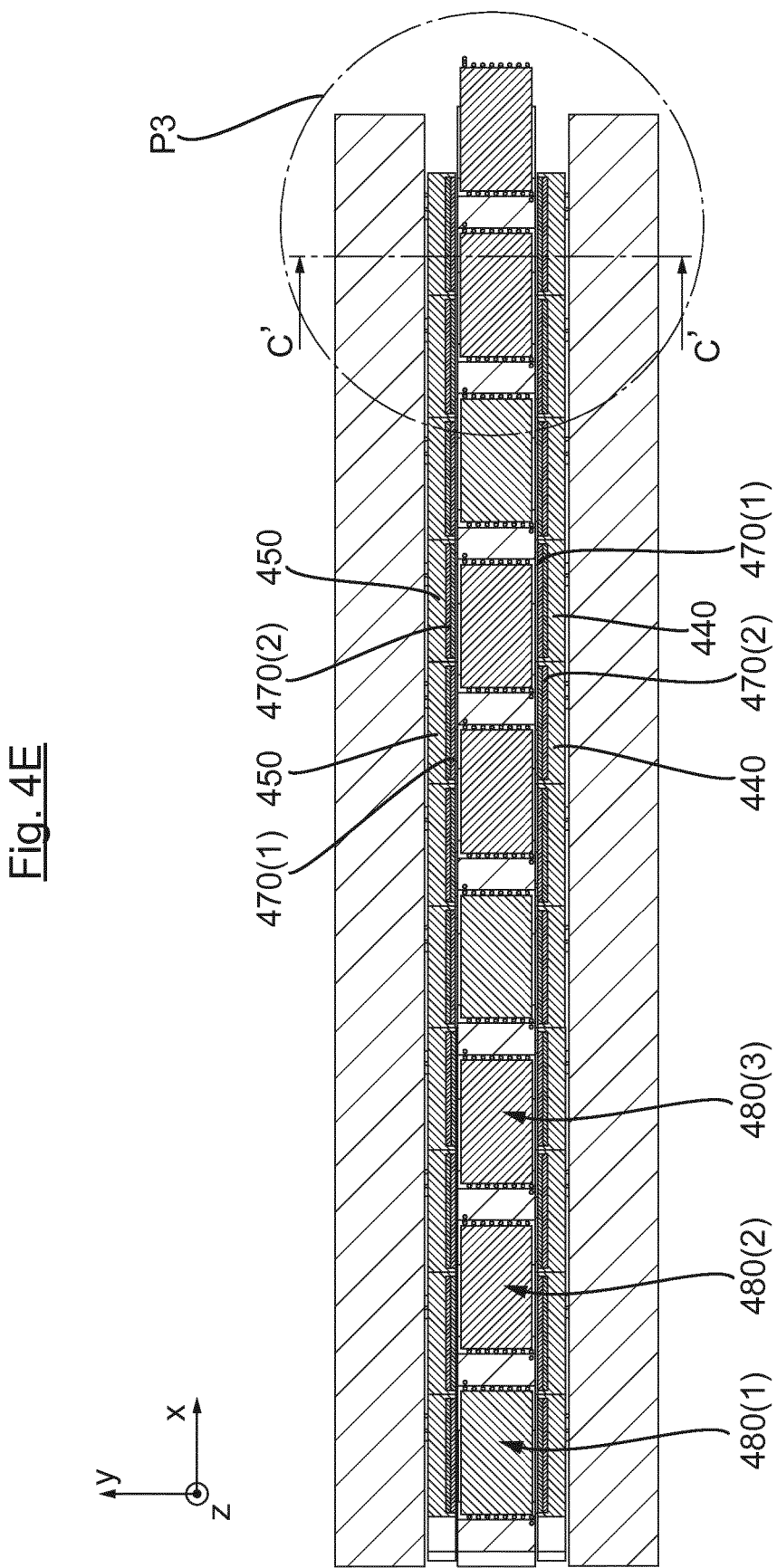
FIG. 4E is a section view of the conveyor of articles of FIG. 4A and FIG. 4B along a section plane parallel to the support surface according to an embodiment of the present invention.
Figure 4F:
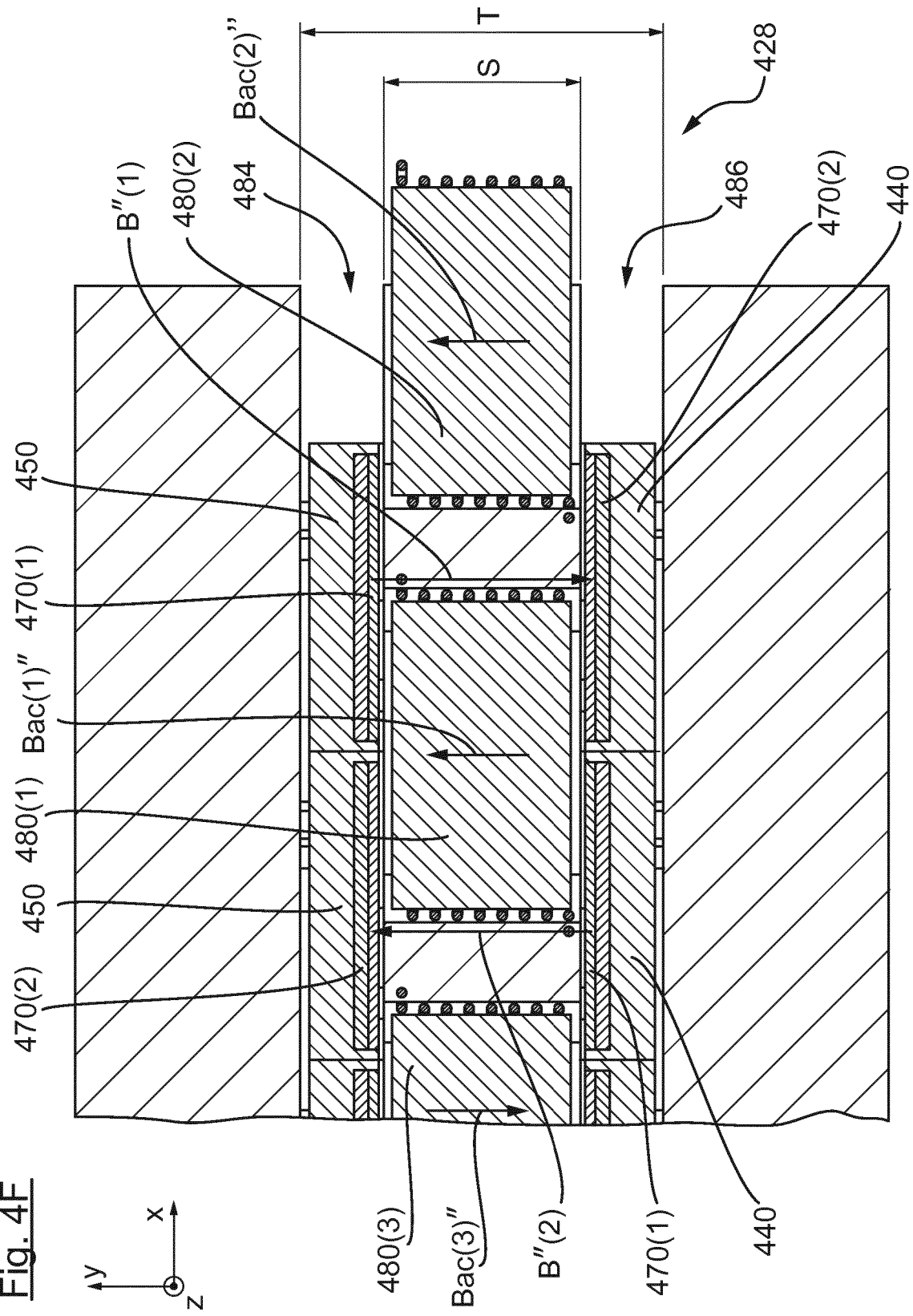
FIG. 4F is an enlarged view of a portion of FIG. 4E.
Figure 4H:
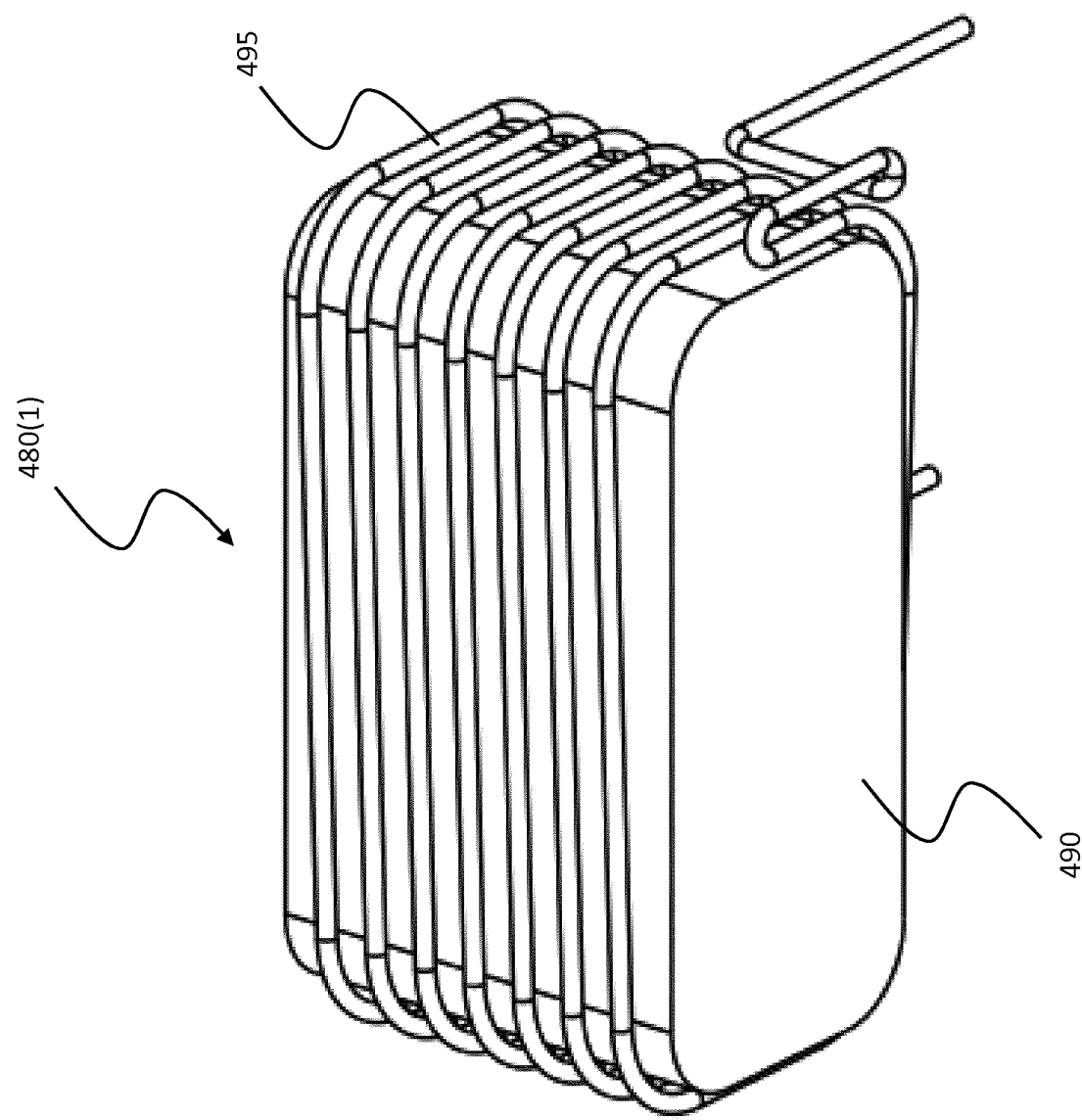
FIG. 4H is an isometric view of one of the propulsion electromagnets located in the guide structure of the conveyor of articles of FIG. 4A and FIG. 4B in accordance with an embodiment of the present invention.

FIG. 4C is an isometric view of the transport chain 405 upside down—i.e., in which the lower faces 402 of the chain links 410 opposite to the first faces 412 are visible. FIG. 4D is a sectional view of the conveyor of articles 400 along a section plane perpendicular to the support surface and passing through the A'—A' of FIG. 4B. FIG. 4E is a sectional view of the conveyor of articles 400 along a section plane parallel to the support surface and passing through the axis B'-B' of FIG. 4D. FIG. 4F is an enlarged view of the portion of FIG. 4E identified with the reference P3. FIG. 4G is a sectional view of the conveyor of articles along a section plane perpendicular to the support surface and passing through axis C'-C' of FIG. 4E. FIG. 4H is an isometric view of one of the propulsion electromagnets located in the guide structure 420.

According to an embodiment of the present invention, each chain link 410 of the transport chain 405 is provided with a pair of wall elements 440, 450 which protrude from below from the lower face 402 along a direction parallel to the z direction (and therefore perpendicular to the support surface).

The wall elements 440, 450 extend along a direction parallel to the x direction, and are distant from each other by a distance S along the y direction. When the chain links 410 are hinged together to form the transport chain 405, the wall elements 440, 450 of the various chain links 410 define as a whole an empty space 460 having a width equal to S which extends along the x direction.

As seen in FIGS. 4A, 4F and 4G, the groove 428 of the guide structure 420 has a width T along the y direction sufficiently wide to allow the wall elements 440, 450 to slide within the groove 428 without entering in contact with the inner walls of the latter perpendicular to the y direction when the transport chain 405 is supported by the guide structure 420. In accordance with an embodiment of the present invention, each chain link 410 comprises a pair of magnets comprising a first magnet 470(1) and a second magnet 470(2). The first magnet 470(1) is located in a respective wall element selected between the two wall elements 410, 420 of the chain link 410, while the second magnet 470(2) is located in the other wall element between the two wall elements 410, 420 of the chain link 410. In this way, in each chain link 410, the respective magnets 470(1), 470(2) are facing each other and are spaced apart—along the y direction—by a distance corresponding to the distance S.

For example, each wall element 410, 420 of a chain link 410 comprises a respective housing for accommodating one of the two magnets 470(1), 470(2) of the torque. As in the embodiments of the invention described above, when the chain links 410 are generated by means of plastic material molding, the housing of the magnets 470(1), 470(2) in the wall elements 440, 450 of the chain links 410 can be obtained by embedding ferromagnetic elements in the molten plastic material during the molding step of the chain links 410 and then magnetising said ferromagnetic elements at a later time.

In this way, when the transport chain 405 is supported by the guide structure 420, and the wall elements 440, 450 are inserted in the groove 428, the magnets 470(1), 470(2) generate a constant magnetic field along a direction parallel to the y direction.

The magnets 470(1), 470(2) are arranged in their respective housings so as to have the north and south poles aligned along the y direction. In each chain link 410, the first magnet 470(1) has the north pole facing the second magnet 470(2), and the second magnet 470(2) has the south pole facing the first magnet 470(1), so that the north pole of the first magnet 470(1) faces the south pole of the second magnet 470(2).

The mutual position along y direction between the first magnet 470(1) and the second magnet 470(2) of a generic chain link 410 is opposite to that between the first magnet 470(1) and the second magnet 470(2) of the two adjacent chain links 410 in the transport chain 405.

In other words, by proceeding chain link 410 by chain link 410 along the sequence forming the transport chain 405, each first magnet 470(1) is alternately housed in the housing of the wall element 440 and in the housing of the wall element 450, while each second magnet 470(2) is housed alternately in the housing of the wall element 450 and in the housing of the wall element 440.

In this way, as shown in FIG. 4F, the magnetic fields generated by the magnets 470(1) and 470(2) provide for an alternation of magnetic fields B(1)"—generated in the links 410 in which the magnets 470(1) are located in the wall elements 450 and the magnets 470(2) are located in the wall elements 440—and magnetic fields B(2)"—generated in the links 410 in which the magnets 470(1) are located in the wall elements 440 and the magnets 470(2) are located in the wall elements 450—opposite to each other.

According to an embodiment of the present invention, the propulsion electromagnets are configured to be energized so as to generate a variable intensity oscillating magnetic field along a direction parallel to the y direction, i.e., parallel to the magnetic fields B(1)" and B(2)" generated by the magnets 470(1) and 470(2).

In a manner equivalent to the embodiments described above, the propulsion electromagnets are located in the guide structure 420 and define, along the movement direction D of the chain, a sequence of propulsion electromagnets comprising an alternation of first propulsion electromagnets 480(1), second propulsion electromagnets 480(2) and third propulsion electromagnets 480(3) in which each first propulsion electromagnet 480(1) is followed by a second propulsion electromagnet 480(2) and each second propulsion electromagnet 480(2) is followed by a third propulsion electromagnet 480(3).

According to an embodiment of the invention, the propulsion electromagnets 480(1), 480(2), 480(3) are located in the groove 428. In the embodiment illustrated in FIGS. 4A-4H, the propulsion electromagnet 480(1), 480(2), 480(3) are housed in a support structure 482 which projects (along the z direction) from the bottom of the groove 428 and longitudinally extends along the groove 428 (parallel to the x direction). The support structure 482 has a width (along the direction y) which is lower than the distance S between the wall elements 440 and 450 of the chain links 410 and is such to define with the side walls of the groove 428 two lateral channels 484, 486 having a width (along the y direction) greater than the thickness (along the y direction) of the wall elements 440 and 450. In this way, the wall elements 440 and 450 can slide within the side channels 484, 486 without touching the side walls when the transport chain 405 is slidably supported on the guide structure 420.

According to an embodiment of the present invention illustrated in FIG. 4G, each propulsion electromagnet 480(1), 480(2), 480(3) comprises a core 490 of ferritic or ferromagnetic material which extends within the structure support 482 along a direction parallel to the y direction, and d a coil 495 wound around the core 490, having an axis of symmetry which is also parallel to the y direction. In this way, during the operation of the conveyor of articles 400, the propulsion electromagnets 480(1), 480(2), 480(3) are localized between pairs of magnets 470(1), 470(2) facing to each other and having surfaces substantially perpendicular to the symmetry axis of the coil 495.

According to an embodiment of the present invention, the support structure 482 is made of thermoplastic materials, such as thermoplastic resins, and the cores 490 with the coils 495 are embedded in the thermoplastic material which forms the support structure 482.

As in the embodiments described previously, the propulsion electromagnets 480(1), 480(2), 480(3) are supplied by a three-phase electric system which provides for each propulsion electromagnet 480(1) to be powered by an alternating electric current having frequency f which has a difference of phase of 120° with respect to the alternating current having frequency f which supplies each propulsion electromagnet 480(2) and a difference of phase of 240° with respect to the alternating current having frequency f which supplies each propulsion electromagnet 480(3).

In this way, as shown in FIG. 4F, the magnetic fields generated by the sequence propulsion electromagnets 480(1), 480(2), 480(3) provide an alternation of magnetic oscillating fields Bac"(1)—generated by the propulsion electromagnets 480(1), Bac"(2)—generated by the propulsion electromagnets 480(2)—and Bac"(3)—generated by the propulsion electromagnets 480(3)—being reciprocally phase shifted by ±120°. The oscillating magnetic fields Bac"(1), Bac"(2), Bac"(3), are directed along the y direction, i.e., parallel to the direction of the constant magnetic fields B(1)" and B(2)" generated by the magnets 470(1) and 470(2) accommodated in the wall elements 440, 450 of the mesh of the chain 410.

The alternation of constant magnetic fields B"(1), B"(2) parallel to the y direction and the alternation of oscillating magnetic fields Bac"(1), Bac"(2), Bac"(3) parallel to the y direction cause the generation of a magnetic force F parallel to the x direction, which pushes the transport chain 405 along the movement direction D, thus making it possible the movement of the transport chain 405 relative to the guide structure 120.

This embodiment allows obtaining advantages which are similar to those obtainable with the previously described embodiments. Furthermore, all the possible modifications of the previously described embodiments can be applied to this embodiment, too.

In addition, since during operation the propulsion electromagnets 480(1), 480(2), 480(3) are surrounded (along the y direction) by pairs of magnets 470(1), 470(2) facing to each other, the magnetic coupling between the propulsion electromagnets 480(1), 480(2), 480(3) and the magnets 470(1), 470(2) is particularly effective, and the magnetic losses are reduced to a minimum. Since the magnetic coupling of propulsion electromagnets/magnets is particularly effective, in accordance with another embodiment of the present invention, the propulsion electromagnets 480(1), 480(2), 480(3) can be implemented by directly embedding the coils. 495 into the thermoplastic material which forms the support structure 482, without providing for the cores 490.

In accordance with a further embodiment of the present invention, each chain link 410, instead of containing a single pair of magnets 470(1), 470(2), may contain two or more pairs of magnets having the north poles and south poles aligned along the y direction, so as to generate more constant magnetic fields parallel to the y direction for each chain link 410.

For example, as shown in the sectional view parallel to the x and y directions of FIG. 5, each chain link 410 may contain three pairs of magnets, with the wall element 450 comprising a first set of magnets consisting of a sequence (along the x direction) of three magnets 510(1), 510(2), 510(3), and the wall element 440 which comprises a second set of magnets consisting of a sequence (along the x direction) of additional three magnets 520(1), 520(2), 520(3).

The magnet 510(1) is facing the magnet 520(1), the magnet 510(2) is facing the magnet 520(2), and the magnet 510(3) is facing the magnet 520(3). Magnets facing to each other on opposing wall elements, as well as adjacent magnets in the same wall element have the north poles and the south poles arranged in opposite way. For example, in the exemplary embodiment shown in FIG. 5:

the magnet 510(1) has the north pole facing the south pole of the magnet 520(1);

the magnet 520(1) has the south pole facing the north pole of the magnet 510(1);

the magnet 510(2) has the south pole facing the north pole of the magnet 520(2);

the magnet 520(2) has the north pole facing the south pole of the magnet 520(1);

the magnet 510(3) has the north pole facing the south pole of the magnet 520(3);

the magnet 520(3) has the south pole facing the north pole of the magnet 510(3).

Naturally, in order to satisfy local and specific requirements, a person skilled in the art may apply to the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments of the invention are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

The invention claimed is:

1. A conveyor system, comprising:
   at least one transport chain comprising a sequence of interconnected chain links;
   a guide structure for slidingly supporting said at least one transport chain so that chain links of the at least one transport chain define a substantially flat support surface for supporting articles to be transported; and a motor for causing the at least one transport chain to move with respect to the guide structure along a first direction parallel to said support surface, wherein:

the motor comprises an electric linear motor comprising:
- a plurality of magnets, each magnet of the plurality of magnets located in a respective chain link; and
- a plurality of propulsion electromagnets located on the guide structure;

wherein:
- each magnet of the plurality of magnets is configured to generate a constant magnetic field along a second direction perpendicular to said first direction; and
- each propulsion electromagnet of the plurality of propulsion electromagnets is configured to be energized in such a way to generate a variable magnetic field along the second direction in such a way to generate a magnetic force along said first direction to cause said movement along the first direction of the at least one transport chain with respect to the guide structure; and wherein:
- the plurality of magnets define a sequence of magnets comprising an alternation of first magnets and second magnets;
- each first magnet and each second magnet is a u-shaped magnet in which the north pole thereof and the south pole thereof are aligned along a third direction perpendicular to said first and to said second directions; and
- a mutual position along the third direction of the north pole and the south pole of each first magnet being opposite than the mutual position along the third direction of the north pole and the south pole of each second magnet.

2. The conveyor system of claim 1, wherein each magnet of the plurality of magnets is a neodymium-based permanent magnet.

3. The conveyor system of claim 1, wherein the plurality of propulsion electromagnets comprises a sequence of propulsion electromagnets along said first direction.

4. The conveyor system of claim 1, in which said second direction is perpendicular to said support surface.

5. The conveyor system of claim 4, wherein:
the plurality of magnets define a sequence of magnets comprising an alternation of first magnets and second magnets;
each first magnet and each second magnet has the north pole thereof and the south pole thereof that are aligned along the second direction;
each first magnet has the north pole thereof that is closer to the support surface than the south pole thereof; and
each second magnet has the south pole thereof that is closer to the support surface than the north pole thereof.

6. The conveyor system of claim 5, wherein each propulsion electromagnet of the plurality of propulsion electromagnets comprises a coil having a symmetry axis thereof which is along the second direction.

7. The conveyor system of claim 1, wherein each magnet of the plurality of magnets is buried in the respective chain link.

8. The conveyor system of claim 1, wherein each propulsion electromagnet of the plurality of propulsion electromagnets comprises a coil and a respective u-shaped ferritic or ferromagnetic member comprising a first and second arms extending along the second direction and a joining portion joining the first and second arms and extending along the third direction, wherein each coil being coiled onto the joining portion of the respective u-shaped member.

9. The conveyor system of claim 1, further comprising an electric supply system for energizing the plurality of propulsion electromagnets, said electric supply system being a selected one among:
a three-phase supply system;
a two-phase supply system; and
a mono-phase supply system.

10. The conveyor system of claim 9, further comprising:
means for sensing a magnetic field generated by the plurality of magnets; and
means for assessing a position and/or a movement speed of the at least one transport chain based on the sensed magnetic field.

11. The conveyor system of claim 1, wherein said at least one transport chain comprises a closed-loop transport chain.

12. The conveyor system of claim 1, wherein each one of said at least one transport chain is a chunk of transport chain separated from the other chunks.

13. A conveyor system, comprising:
at least one transport chain comprising a sequence of interconnected chain links;
a guide structure for slidingly supporting said at least one transport chain so that chain links of the at least one transport chain define a substantially flat support surface for supporting articles to be transported; and
a motor for causing the at least one transport chain to move with respect to the guide structure along a first direction parallel to said support surface, wherein:
the motor comprises an electric linear motor comprising:
- a plurality of magnets, each magnet of the plurality of magnets located in a respective chain link; and
- a plurality of propulsion electromagnets located on the guide structure;

wherein:
- each magnet of the plurality of magnets is configured to generate a constant magnetic field along a second direction perpendicular to said first direction; and
- each propulsion electromagnet of the plurality of propulsion electromagnets is configured to be energized in such a way to generate a variable magnetic field along the second direction in such a way to generate a magnetic force along said first direction to cause said movement along the first direction of the at least one transport chain with respect to the guide structure; and wherein said second direction is parallel to said support surface; and
wherein each chain link comprises a first set of magnets of the plurality of magnets and a second set of magnets of the plurality of magnets, wherein:
each magnet of the first set of magnets is faced toward a respective magnet of the second set of magnets along said second direction; and
the plurality of propulsion electromagnets are located on the guide structure between the magnets of the first set and the magnets of the second set.

14. The conveyor system of claim 13, wherein each propulsion electromagnet of the plurality of propulsion electromagnets comprises a coil having a symmetry axis along the second direction.

15. The conveyor system of claim 13, wherein said first set of magnets consists of a single magnet and wherein said second set of magnets consists of a single magnet.

16. The conveyor system of claim 13, wherein said first set of magnets comprises three magnets and wherein said second set of magnets comprises three magnets.

17. The conveyor system of claim 13, wherein the plurality of propulsion electromagnets comprises a sequence of propulsion electromagnets along said first direction.

18. The conveyor system of claim 13, wherein each magnet of the plurality of magnets is a neodymium-based permanent magnet.

19. The conveyor system of claim 13, wherein each magnet of the plurality of magnets is buried in the respective chain link.

20. The conveyor system of claim 13, further comprising an electric supply system for energizing the plurality of propulsion electromagnets, said electric supply system being a selected one among:
   a three-phase supply system;
   a two-phase supply system; and
   a mono-phase supply system.

21. The conveyor system of claim 20, further comprising:
   means for sensing a magnetic field generated by the plurality of magnets; and
   means for assessing a position and/or a movement speed of the at least one transport chain based on the sensed magnetic field.

22. The conveyor system of claim 13, wherein said at least one transport chain comprises a closed-loop transport chain.

23. The conveyor system of claim 13, wherein each one of said at least one transport chain is a chunk of transport chain separated from the other chunks.

\* \* \* \* \*